US008126464B2

(12) United States Patent
Aoyama

(10) Patent No.: US 8,126,464 B2
(45) Date of Patent: Feb. 28, 2012

(54) RADIO COMMUNICATION BASE STATION DEVICE

(75) Inventor: Takahisa Aoyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 618 days.

(21) Appl. No.: 12/293,997

(22) PCT Filed: Mar. 23, 2007

(86) PCT No.: PCT/JP2007/056066
§ 371 (c)(1),
(2), (4) Date: Sep. 22, 2008

(87) PCT Pub. No.: WO2007/111265
PCT Pub. Date: Oct. 4, 2007

(65) Prior Publication Data
US 2009/0247163 A1 Oct. 1, 2009

(30) Foreign Application Priority Data
Mar. 24, 2006 (JP) .................................. 2006-084043

(51) Int. Cl.
H04W 36/00 (2009.01)
(52) U.S. Cl. ........................................ 455/436; 455/561
(58) Field of Classification Search .................. 455/436
See application file for complete search history.

(56) References Cited

U.S. PATENT DOCUMENTS 5,423,067 A * 6/1995 Manabe ......................... 455/524
7,493,090 B2 * 2/2009 Lee et al. ..................... 455/67.11
2002/0128035 A1 * 9/2002 Jokinen et al. ................ 455/552
2007/0037594 A1 2/2007 Palenius

FOREIGN PATENT DOCUMENTS
JP 2006-523392 10/2006

OTHER PUBLICATIONS
International Search Report dated Jun. 19, 2007.

* cited by examiner

Primary Examiner — Kwasi Karikari
Assistant Examiner — Christopher Kohlman
(74) Attorney, Agent, or Firm — Dickinson Wright PLLC

(57) ABSTRACT

Provided is a radio communication base station device capable of reducing a message size in a call connection. In the device, a report information creation unit (203) creates report information by allocating cell level information as Preconfiguration information managed at a cell level and PLMN level information as Preconfiguration information managed at a PLMN level to different transmission units and the created report information is reported from a report information transmission unit (204) to UE. A Preconfiguration use decision unit (208) judges whether the UE which sets a channel can use Preconfiguration. If yes, a control information creation unit (209) includes the corresponding Index in control information and the control information is transmitted from a control information transmission unit (210) to the UE.

4 Claims, 34 Drawing Sheets

| RRC TRANSACTION IDENTIFIER | |
|---|---|
| INTEGRITY RELATED INFORMATION | |
| CIPHERING RELATED INFORMATION | |
| ACTIVATION TIME | |
| IDENTIFIER OF UE | |
| RRC STATE INDICATOR | |
| DRX CYCLE LENGTH | |
| CORE NETWORK INFORMATION | |
| RAB5 | RAB20 |
| RLC INFO | RLC INFO |
| MAPPING INFO | MAPPING INFO |
| PDCP INFO | PDCP INFO |
| UL/ DL COMMON TRANSPORT CHANNEL INFORMATION | |
| TrCH INFO | TrCH INFO |
| PHYSICAL CHANNEL INFORMATION | |

IE USING PRECONFIGURATION: rows from RRC TRANSACTION IDENTIFIER through CORE NETWORK INFORMATION

IE FOR SETTING RB: RAB5/RAB20, RLC INFO, MAPPING INFO, PDCP INFO

IE FOR SETTING TrCH: UL/DL COMMON TRANSPORT CHANNEL INFORMATION, TrCH INFO

FIG.3
PRIOR ART

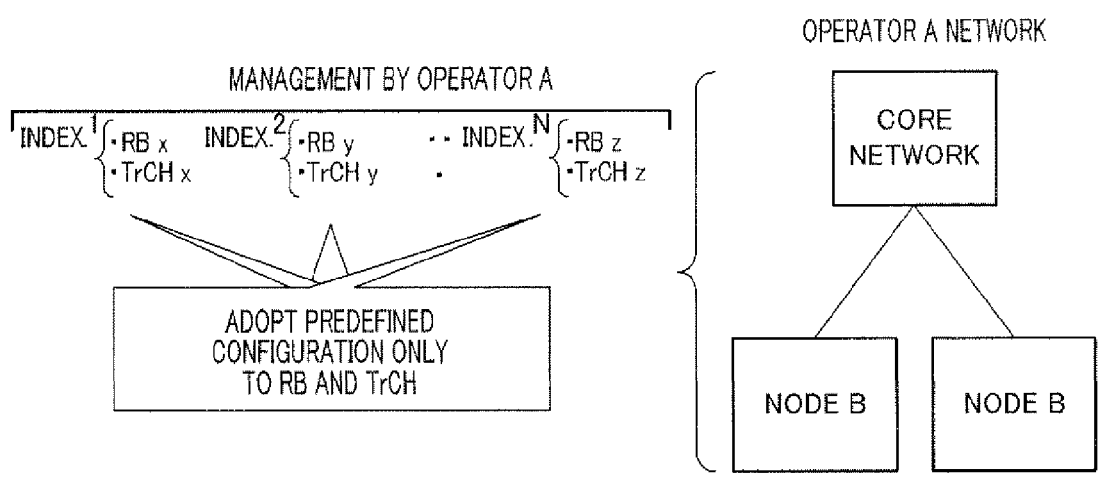

FIG.4
PRIOR ART

```
INDEX 1 {
    NUMBER OF RB    = x
    RB IDENTITY     = a
    RLC MODE        = UM
    ...
    NUMBER OF TrCH  = x
    TrCH IDENTITY   = a
    TrCH TYPE       = DCH
    ...
    TFCS   = a
    ...
}
INDEX 2 {
    NUMBER OF RB    = y
    RB IDENTITY     = b
    RLC MODE        = AM
    ...
    NUMBER OF TrCH  = y
    TrCH IDENTITY   = b
    TrCH TYPE       = HS - DSCH
    ...
    TFCS   = b
    ...
}
    ...
INDEX M {
    NUMBER OF RB    = z
    RB IDENTITY     = c
    RLC MODE        = AM
    ...
    NUMBER OF TrCH  = z
    TrCH IDENTITY   = c
    TrCH TYPE       = E - DCH
    ...
    TFCS   = c
    ...
}
```

FIG.7

```
INDEX 1 {
  FREQUENCY = x
  SCRAMBLING CODE = x
  SPREADING FACTOR = x
  NUMBER OF CANALIZATION CODE = x
  DIVERSITY MODE = FALSE
  FEED BACK INFO = TRUE
  HARQ BUFFER = xxxkB
  HANDOVER = TIMING MAINTAIN
  ...
}
INDEX 2 {
  FREQUENCY = y
  SCRAMBLING CODE = y
  SPREADING FACTOR = y
  NUMBER OF CANALIZATION CODE = y
  DIVERSITY MODE = TRUE
  FEED BACK INFO = FALSE
  HARQ BUFFER = yyykB
  HANDOVER = TIMING INITIALIZED
  ...
}
    ...
INDEX N {
  FREQUENCY = z
  SCRAMBLING CODE = z
  SPREADING FACTOR = z
  NUMBER OF CANALIZATION CODE = z
  DIVERSITY MODE = TRUE
  FEED BACK INFO = TRUE
  HARQ BUFFER = zzzkB
  HANDOVER = TIMING INITIALIZED
  ...
}
```

FIG.8

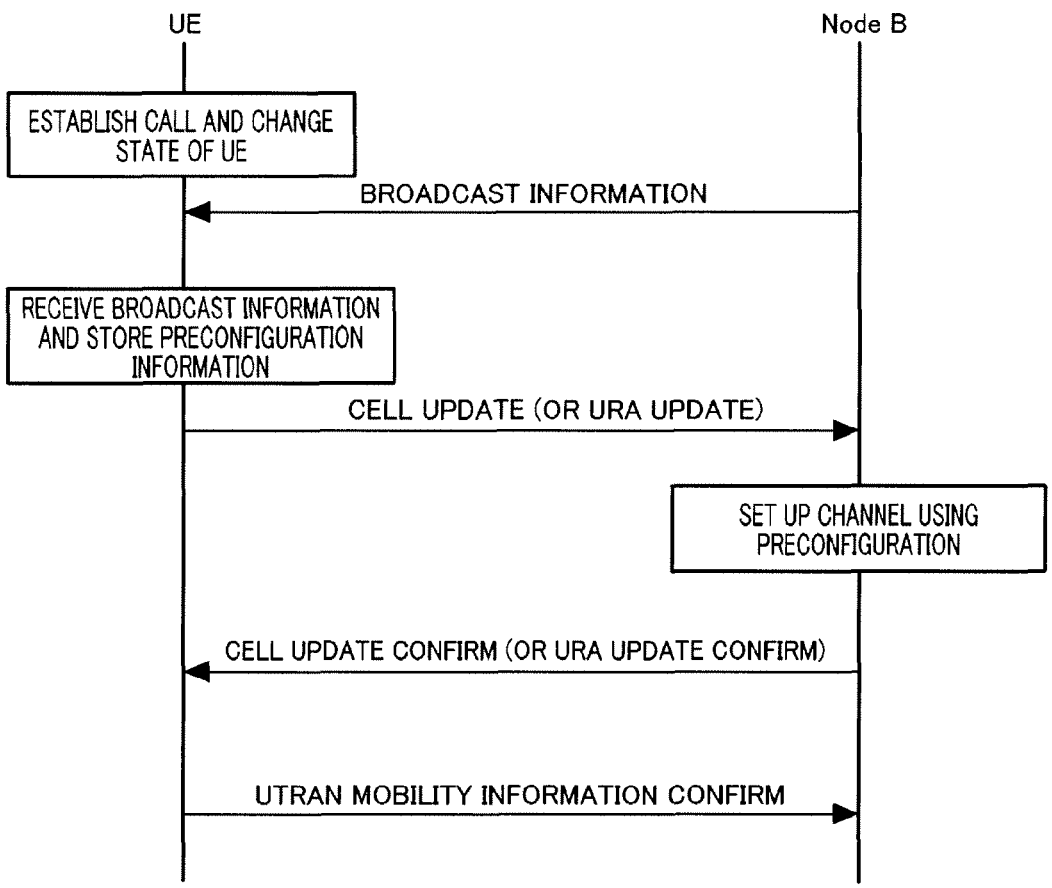

FIG.13

PLMN PRECONFIGURATION STATUS= TRUE
CELL PRECONFIGURATION STATUS= TRUE
INITIAL UE IDENTITY = 20
ESTABLISHMENT CAUSE = " ORIGINATING
　　　　　　　　　　　　　STREAMING CALL "
UE CAPABILITY INDICATION = HS -DSCH
ACCESS STATUM RELEASE INDICATOR=　RELEASE 5

FIG.14

INITIAL UE IDENTITY = 20
RRC TRANSACTION IDENTIFIER = 2
ACTIVATION TIME = NOW
NEW U - RNTI = 10
RRC STATE INDICATOR = CELL _DCH
UTRAN DRX CYCLE LENGTH COEFFICIENT = 6
CAPABILITY UPDATE REQUIREMENT = FALSE
PREDEFINED CONFIGURATION{
　PLMN LEVEL INDEX = 3
　CELL LEVEL INDEX = 2
}

FIG.15

```
MEASUREMENT IDENTITY = 2
MEASURED RESULTS
  CELL MEASURED RESULTS {
    CELL ID = 1
    SCRAMBLING CODE = 4
    CPICH RSCP     = -100 dB
    CELL PRECONFIGURATION STATUS = TRUE
  }
  CELL MEASURED RESULTS {
    CELL ID = 2
    SCRAMBLING CODE = 6
    CPICH RSCP     = -105 dB
    CELL PRECONFIGURATION STATUS = TRUE
  }
  CELL MEASURED RESULTS {
    CELL ID = 3
    SCRAMBLING CODE = 8
    CPICH RSCP     = -110 dB
    CELL PRECONFIGURATION STATUS = FALSE
  }
```

FIG.23

| BCH (PRECONFIGURATION FOR RB/TrCH) | ... | BCH (PRECONFIGURATION FOR PhyCH 1 THAT IS INFORMATION NOT RELATING TO QoS) | ... | BCH (PRECONFIGURATION FOR PhyCH2 THAT IS INFORMATION RELATING TO QoS) |

FIG.29

RADIO COMMUNICATION BASE STATION DEVICE

TECHNICAL FIELD

The present invention relates to a wireless communication base station apparatus.

BACKGROUND ART

Generally, a radio access network ("RAN") is comprised of the radio network controller ("RNC") and the node B, where the RNC is connected to the core network ("CN"), which is a switching network through the Iu interface, and the node B is connected to the user equipment ("UE") through the radio interface.

The protocol architecture of the radio interface is comprised of layer 1 (physical layer), layer 2 (data link layer) and layer 3 (network layer), where a logical channel is defined between layer 3 and layer 2 and a transport channel is defined between layer 2 and layer 1.

Layer 2 is divided into two sub-layers, namely the radio link control ("RLC") for controlling a radio link and medium access control ("MAC") for controlling radio resource assignment and so on.

Furthermore, layer 3 is divided into the C-plane for implementing call setting control and the U-plane for implementing user information transmission. The C-plane is further divided into the radio resource control ("RRC") for directly controlling layer 1 and layer 2 and the non-access stratum ("NAS") for implementing higher-layer control. Here, mobility management ("MM") is a function that plays a central role in the NAS.

RRC provides several services, including reporting of broadcast information to all UEs in the area, calling out a specific UE, and setting, changing and releasing connections, and plays an important role in call connection between the UE and the network.

For establishing a call between the UE and the network, it is necessary to transmit messages including a great amount of information as setting information (hereinafter information element or "IE"), which is a factor of delay in call connection. Messages having particularly a large amount of information include an RRC connection setup message (for establishment of control information channel) and a radio bearer setup message (for establishment of traffic data channel) for establishing a radio channel.

Here, the method of reducing a call connection delay, called "preconfiguration," (generic term for default configuration, predefined configuration and stored configuration) for reducing the size of a message related to call connection is standardized in the 3rd generation partnership project ("3GPP"). Preconfiguration will be explained below.

As for preconfiguration, Non-Patent Document 1 defines two methods based on the basic concept of holding representative information in the UE and reporting only indexes from the network to the UE without transmitting radio channel establishment information as needed.

First, the default configuration will be explained. In the default configuration, configuration patterns are set up by assigning indexes (14 types) to configuration patterns defined in advance (see section 2 of Non-Patent Document 1 for details), making the UE hold these indexes and reporting the indexes from the network.

Thus, the indexes are the only information (messages such as the RRC connection setup message and radio bearer setup message) that is transmitted from the network, and so the size of these messages can be reduced significantly, so that it is possible to reduce call connection delay. By the way, only the configuration patterns that are defined can be used, and so it is not possible to perform operator-specific setting or UE-specific setting.

Next, the predefined configuration will be explained. In the predefined configuration, configuration patterns and the corresponding indexes (16 types) are transmitted using a channel broadcasted from the network. The UE receives broadcast information transmitted from the network in an idle state or the like and holds the configuration patterns and indexes. The UE reports whether or not the UE has the relationships between the configurations and indexes to the network upon transmitting an RRC connection request message.

On the other hand, when it is decided that the UE holds the broadcast information, the network can transmit indexes alone as in the default configuration and reduce the size of messages, so that it is possible to reduce call connection delay. Unlike the default configuration, the predefined configuration enables operator-specific setting. However, radio resources are used wastefully taking into account the UE not using the configuration transmitted in broadcast information.

Here, FIG. 1 shows a multi-call channel structure. As shown in FIG. 1, three signaling radio bearers ("SRBs") are provided for control signals, and a transport channel is assigned to each SRB. Furthermore, multi-call including packet call and speech call is assumed here, and so radio access bearer ("RAB") 20 and RAB5 are provided as traffic data (the RAB numbers are examples). Transport channels are assigned to these RAB's. Therefore, in the example of FIG. 1, five transport channels are mapped to the physical channel.

As a message for making the setting shown in FIG. 1 in the UE, FIG. 2 shows an RRC connection setup message as an example, and FIG. 3 shows a radio bearer setup message as an example. As shown in FIG. 2 and FIG. 3, the preconfiguration applies only to the RB setting IE and the TrCH setting IE. Here, as shown in FIG. 4, the predefined configuration is applied such that the details set up by the predefined configuration are common in the operator. That is, the setting details need to be the same across cells.

Non-Patent Document 1: 3GPP TR25.331, "Radio Resource Control (RRC) Protocol Specification"

Non-Patent Document 2: Signaling Enhancements for CS and PS Connection Analyses and Recommendations

DISCLOSURE OF INVENTION

Problem to be solved by the Invention

However, if the details included in the configuration represented by one index include all of the RB, TrCH and PhyCH, different indexes are necessary even when only part of the details vary, resulting in an enormous number of indexes.

Furthermore, if the preconfiguration is applied on a per cell basis, not on a per operator basis, the amount of information that the UE must hold to move between cells increases.

As described above, it is difficult to apply the preconfiguration to the PhyCH having different settings per cell, and the preconfiguration can only be applied to RB setting IE and TrCH setting IE. As a result, the size of messages cannot be reduced significantly.

It is therefore an object of the present invention to provide a wireless communication terminal apparatus for reducing the size of messages in call connection.

Means for Solving the Problem

The wireless communication base station apparatus employs a configuration having: a management section that manages in a layered manner configuration information comprising combination patterns of channel setting information and indexes representing the configuration information; a broadcast section that broadcasts public land mobile network level preconfiguration information comprising setting information of a radio bearer and a transport channel employing common settings in an operator and cell level preconfiguration information comprising setting information of a physical channel employing different settings between cells; a control information creating section that includes information showing that preconfiguration information of another radio access technology has changed, in control information that specifies channel setting information by an index representing the public land mobile network level preconfiguration information and an index representing the cell level preconfiguration information; and a transmitting section that transmits the created control information.

Advantageous Effect of the Invention

According to the present invention, it is possible to reduce the size of messages in call connection.

BRIEF DESCRIPTION OF DRAWINGS

FIG. 3 is a conceptual diagram showing an IE configuration of a radio bearer setup message;

FIG. 4 is a conceptual diagram showing a range of application of a predefined configuration;

FIG. 7 is a conceptual diagram showing PLMN level information;

FIG. 8 is a conceptual diagram showing cell level information;

FIG. 13 is a sequence diagram showing an outline of communication steps for the UE and node B in a call connection state;

FIG. 14 is a conceptual diagram showing an RRC connection request;

FIG. 15 is a conceptual diagram showing RRC connection setup message;

FIG. 23 is a conceptual diagram showing a measurement report message;

FIG. 29 illustrates a configuration of broadcast information according to Embodiment 4 of the present invention;

BEST MODE FOR CARRYING OUT THE INVENTION

Figure 1:
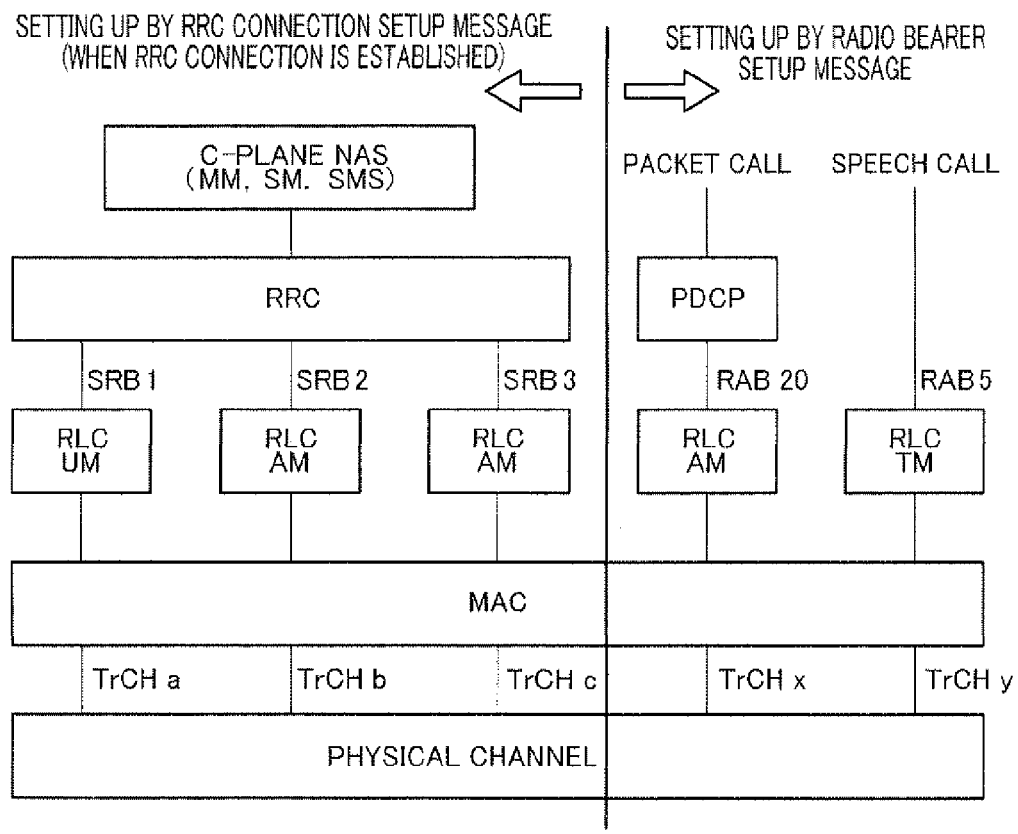
FIG. 1 shows a multi-call channel structure.

Embodiments of the present invention will be explained below in detail with reference to the accompanying drawings. However, configurations having the same functions among the embodiments will be assigned the same reference numerals and overlapping explanations will be omitted.

Embodiment 1

Figure 5:
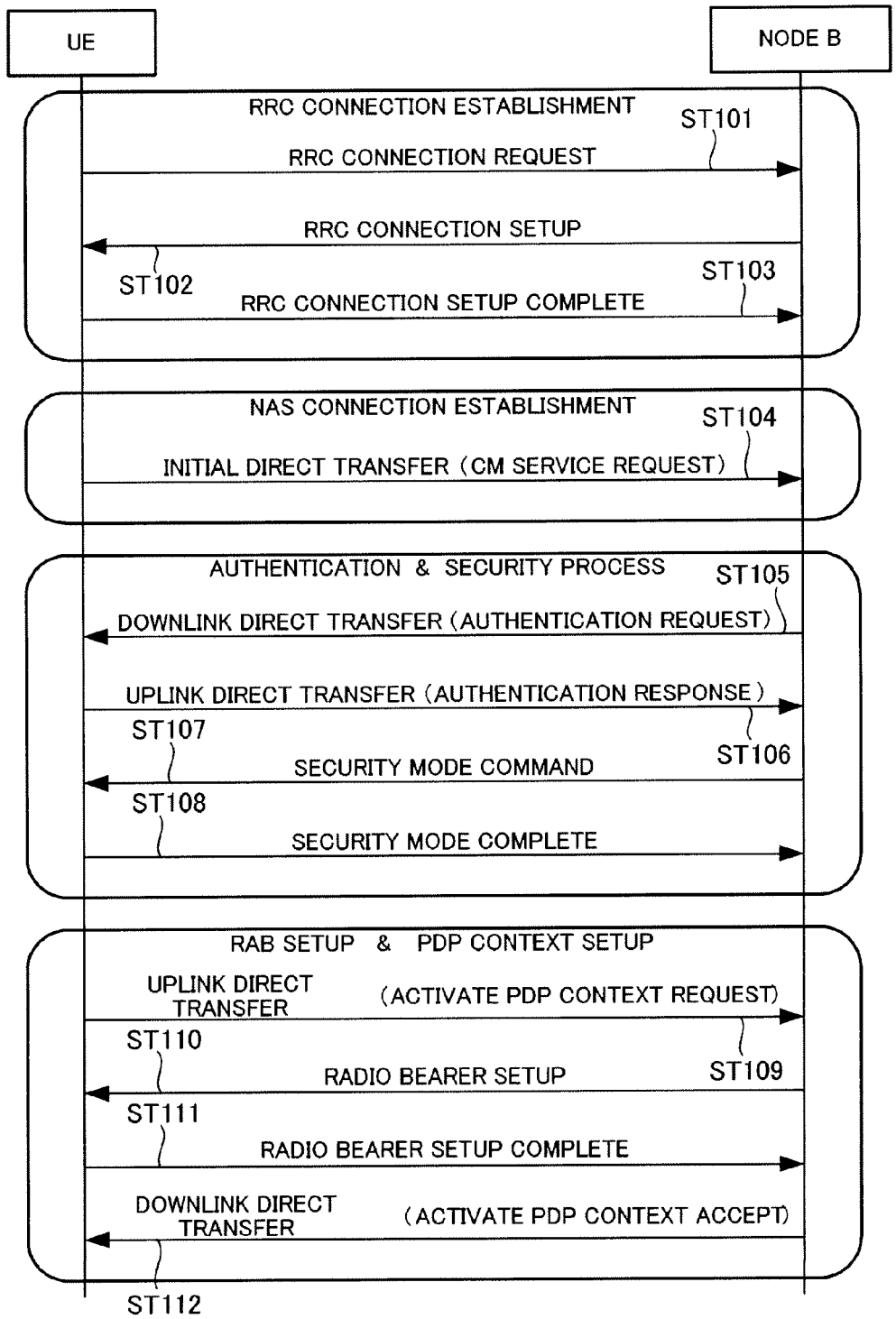
FIG. 5 is a sequence diagram showing general call connection steps for the UE and the node B.

First, general call connection steps between the radio communication terminal apparatus ("UE," standing for user equipment) and the radio communication base station apparatus ("node B") will be explained using FIG. 5. In ST101 in FIG. 5, the UE transmits an RRC connection request message to the node B, and, in ST102, the node B transmits an RRC connection setup message to the UE in response to the RRC connection request message and reports the UE identity, the channel setting for control information, and so on.

In ST103, the UE performs a channel setting on the UE side according to the details reported in the RRC connection setup message and transmits an RRC connection setup complete message to the node B to report completion of the setting.

RRC connection establishment is completed through these processing in ST101 to ST103. In this RRC connection establishment, signaling radio bearers ("SRBs") RB1 (applying an RLC UM mode), RB2 (applying RLC AM for transmission of an RRC message not including a NAS message) and RB3 (applying RLC AM for transmission of an RRC message including a NAS message) for transmitting control information, are established as channels. The details to be set up for each channel include the priority of the channel, the PDU length of the message to be transmitted, the transport channel type to be used and other transport channel information in addition to the above-described RLC modes.

Next, in ST104, the UE creates a CM service request message which is a NAS message for requesting the start of service, and transmits to the node B, an initial direct transfer message which is an RRC message and which includes the created CM service request message. The node B starts managing the UE in MM using the initial direct transfer message as a trigger. NAS connection establishment is completed by the processing in ST104.

In ST105, the node B transmits to the UE, a downlink direct transfer message including an authentication request. Furthermore, in ST106, the UE transmits to the node B an uplink direct transfer message including an authentication response. By this means, the UE and the node B perform an authentication.

In ST107, the node B transmits a security mode command message to the UE and reports the confidentiality/encryption setting, including information about the random numbers used for security. In ST108, in response to the security mode command message, the UE transmits a security mode complete message to the node B at an uplink control timing. The authentication and security process are completed by processing in ST105 to ST108.

In ST109, the UE includes the RRC message in a NAS message and transmits the NAS message, that is, the UE transmits a request for establishing PDP context (packet session) to the node B, and, in ST110, the node B transmits a radio bearer setup message to the UE and sets up a radio access bearer ("RAB") which is a traffic data communication channel.

In ST111, the UE transmits a radio bearer setup complete message to the node B and reports that the RAB has been set up successfully, and, in ST112, the node B transmits to the UE a downlink direct transfer message including the message in response to the establishment of PDP context, thereby reporting the completion of the establishment of PDP context eventually. RAB setup and PDP context setup are completed by the processing in ST109 to ST112.

As described above, a call is established through the processing in ST101 to ST112. In this case, each message includes much information that should be transmitted as the IE. Here, messages that carry particularly a great amount of information include the RRC connection setup message (which is for establishment of a channel for control information) for establishing a radio channel, and a radio bearer setup message (which is for establishment of a traffic data channel), and therefore preconfiguration may be applied to these messages.

Figure 6:
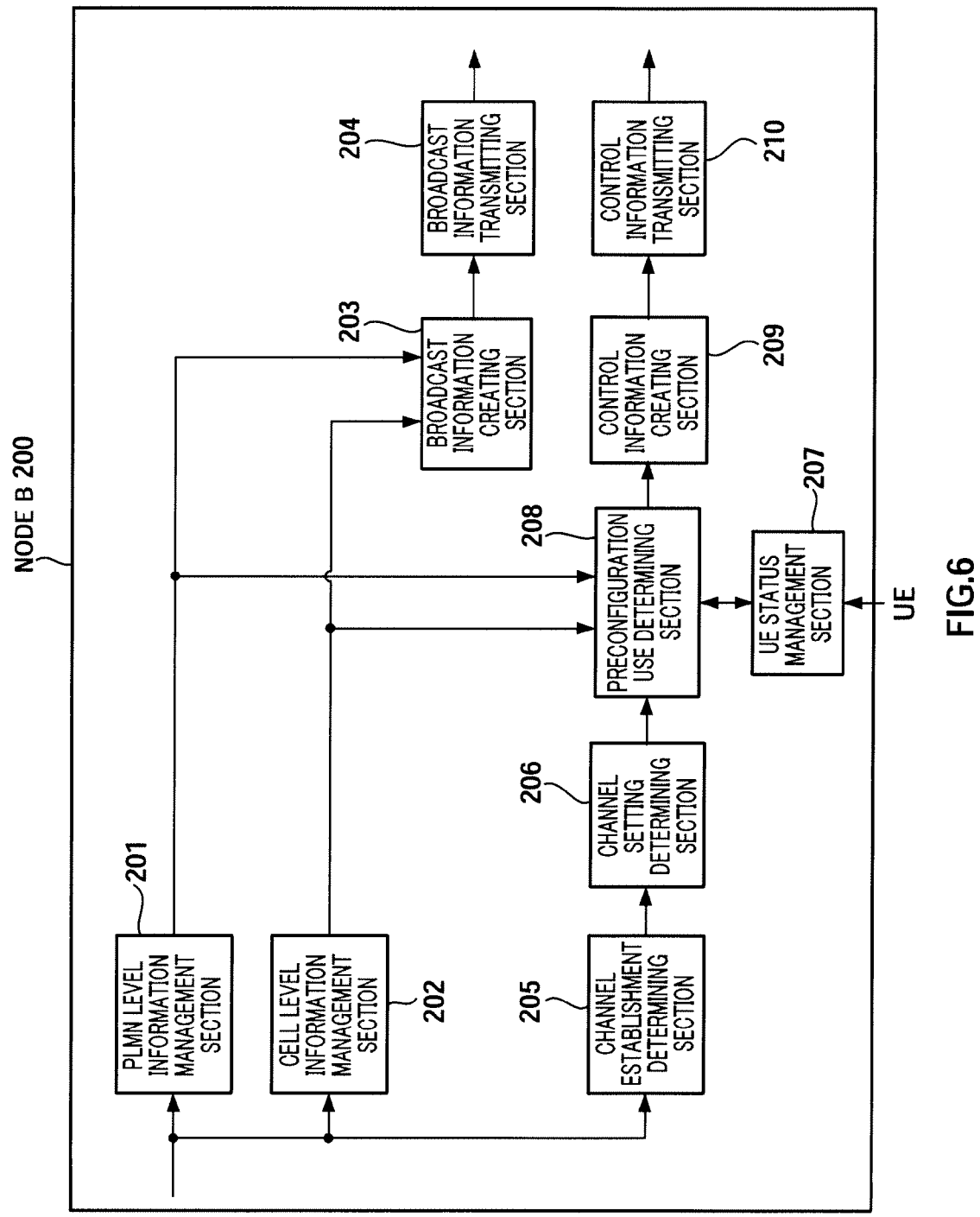
FIG. 6 is a block diagram showing the configuration of the node B according to Embodiment 1 of the present invention.

FIG. 6 is a block diagram showing the configuration of node B 200 according to Embodiment 1 of the present invention. In this figure, PLMN information management section 201 manages preconfiguration information transmitted from a higher layer (or a higher node) (not shown) and managed at the public land mobile network ("PLMN") level (hereinafter "PLMN level information"). PLMN level information includes the broadcast information system information block type 16 in the WCDMA system (see TS25.331 10.2.48.8.19). As shown in FIG. 7, for example, the PLMN level information includes, the number of RBs, the identity of each RB, the RLC mode, the number of TrCHs, the identity of each TrCH, the TrCH type and the TFCS, and the combinations of these information are associated with different indexes. The preconfiguration information managed at the PLMN level is outputted to broadcast information creating section 203 and preconfiguration use determining section 208. In addition to the above-described information, information specifying the version of this preconfiguration information may be included.

Cell level information management section 202 manages the preconfiguration information transmitted from a higher layer (or a higher node) (not shown) and managed at the cell level (hereinafter "cell level information"). The cell level information includes details set up by the PhyCH information elements, uplink radio resources and downlink radio resources in the physical channel reconfiguration message, which are messages in the WCDMA system. For example, as shown in FIG. 8, cell level information includes the frequency band, the scrambling code number, the spreading factor, the number of canalization codes, the diversity mode, the presence or absence of feedback information, the HARQ buffer size and the handover type, and the combinations of these information are associated with different indexes. The preconfiguration information managed at the cell level is outputted to broadcast information creating section 203 and preconfiguration use determining section 208. In addition to the above-described information, information specifying the version of this preconfiguration information may be included.

Figure 9:
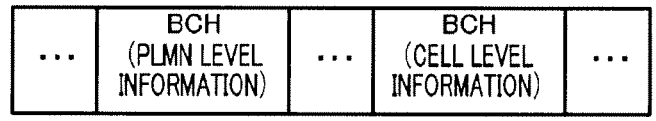
FIG. 9 shows transmission assignment of the PLMN level information and cell level information.

Broadcast information creating section 203 creates broadcast information including the PLMN level information outputted from PLMN level information management section 201 and the cell level information outputted from cell level information management section 202. As shown in FIG. 9, it is assumed that the PLMN level information and the cell level information are assigned to different transmission units (e.g., blocks) in the broadcast information. By this means, the UE can receive any preconfiguration selectively. The created broadcast information is outputted to broadcast information transmitting section 204. Here, the information can also be transmitted in the same block instead of different blocks.

Broadcast information transmitting section 204 applies predetermined transmission processing to the broadcast information outputted from broadcast information creating section 203, and transmits the broadcast information after the transmission processing to the UE.

Channel establishment determining section 205 receives a service request (for speech, streaming, etc.) reported from a higher layer (not shown) and determines whether to establish or cancel a channel. Specific examples of service requests reported from the higher layer include signaling connection establishment, mobile originating call establishment or packet mode connection establishment, emergency call establishment, short message service, supplementary service activation and voice group call establishment. Specific examples of the types of channels to be established (the speech channel, the streaming channel, the signaling channel, etc.) include SRB 1, 2 and 3 for signaling connection or the corresponding TrCH and PhyCH, an RAB for speech or the corresponding TrCH and PhyCH, and an RAB for packets or the corresponding TrCH and PhyCH. The types of channels determined to be established (such as speech communication and streaming communication) are reported to channel setting determining section 206.

Figure 2:
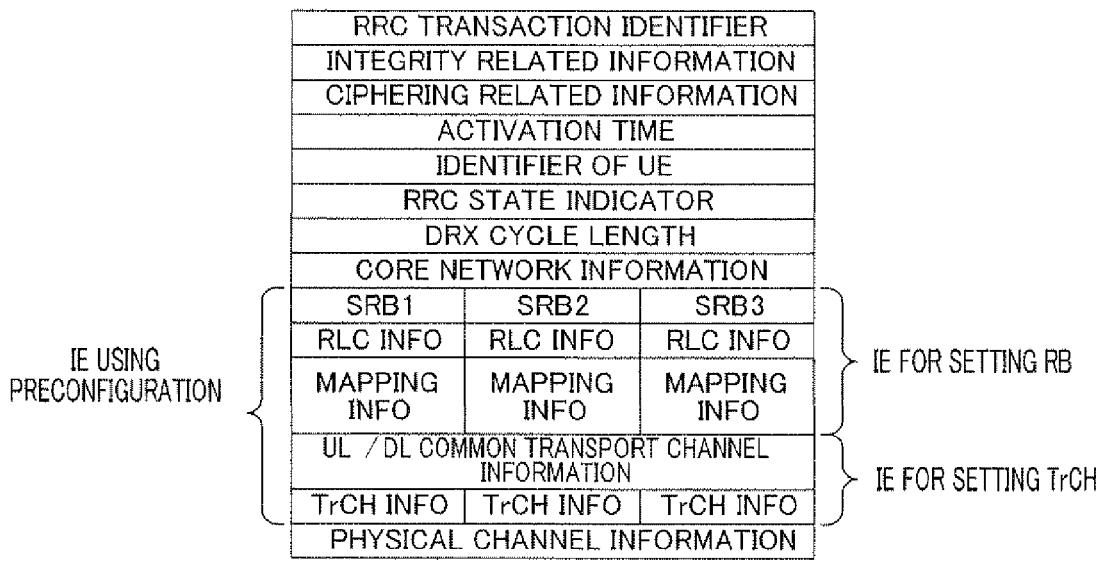
FIG. 2 is a conceptual diagram showing an IE configuration of an RRC connection setup message.

Channel setting determining section 206 determines the detailed setting for each channel (which is needed to establish a channel) based on the type of channel reported from channel establishment determining section 205. More specifically, channel setting determining section 206 determines the setting of each channel shown in FIG. 2 and FIG. 3, which includes, in the case of RB setting for example, the RB/RAB identity, CN domain identity (CS or PS), reestablishment timer (the reestablishment timer of CS is shorter than of PS), PDCP-related information (which is for setting related to header compression and which is not necessary if no header compression is carried out), modes of RLC (the acknowledged mode ("AM"), the unacknowledged mode ("UM") and the transparent mode ("TM")), various settings of RLC (such as the window size of RLC and the timer for ACK transmission), and information specifying to which TrCH, the RB is mapped.

Furthermore, in the case of the setting for TrCH, channel setting determining section 206 determines, for example, the TrCH identity, the type of TrCH (DCH, HS-DSCH, E-DCH, etc.), the PDU size, TTI, the coding rate, the rate matching attribute, the CRC size, the transport format combination set ("TFCS") and the buffer size of the TrCH.

Furthermore, in the case of the setting for PhyCH, channel setting determining section 206 determines, for example, frequency information (information of the frequency band), the maximum uplink transmission power, the scrambling code type, the scrambling code number, the spreading factor and radio timing information.

The setting information determined in this way (hereinafter "channel setting information") is outputted to preconfiguration use determining section 208.

UE status management section 207 acquires, from the UE, the status as to whether or not the UE holds PLMN information and cell level information, manages the acquired UE status and the ID of the UE, and, upon receiving a UE status report request from preconfiguration use determining section 208, UE status management section 207 sends back the corresponding status to preconfiguration use determining section 208.

Preconfiguration use determining section 208 decides whether or not the channel setting information outputted from channel setting determining section 206 is included in the PLMN level information outputted, from PLMN level information management section 201 and the cell level information outputted from cell level information management section 202. Further, if the channel setting information is included in the preconfiguration information, preconfiguration use determining section 208 decides, per PLMN level and cell level, whether or not the corresponding UE can finally use the preconfiguration, based on the UE status acquired from UE status management section 207. If the UE can use the preconfiguration, preconfiguration use determining section 208 to control information creating section 209, both or one of the corresponding PLMN level index and the cell level index. On the other hand, if the UE cannot use the preconfiguration, preconfiguration use determining section 208 outputs the channel setting information itself to control information creating section 209.

Figure 10:
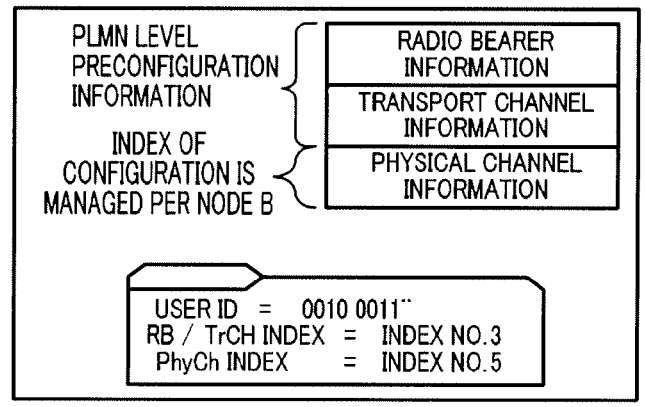
FIG. 10 is a conceptual diagram showing control information including PLMN level and cell level indexes.

Control information creating section 209 includes the PLMN level index outputted from preconfiguration use determining section 208 and the cell level index, or the channel setting information in the RRC connection setup message, a radio bearer setup message, a radio bearer reconfiguration message and so on, and outputs them to control information transmitting section 210 as control information. For reference, FIG. 10 shows an image of control information including a PLMN level index (Index No. 3) and a cell level index (Index No. 5).

Control information transmitting section 210 applies predetermined transmission processing to the control information outputted from control information creating section 209, and transmits the control information after the transmission processing to the UE.

Figure 11:
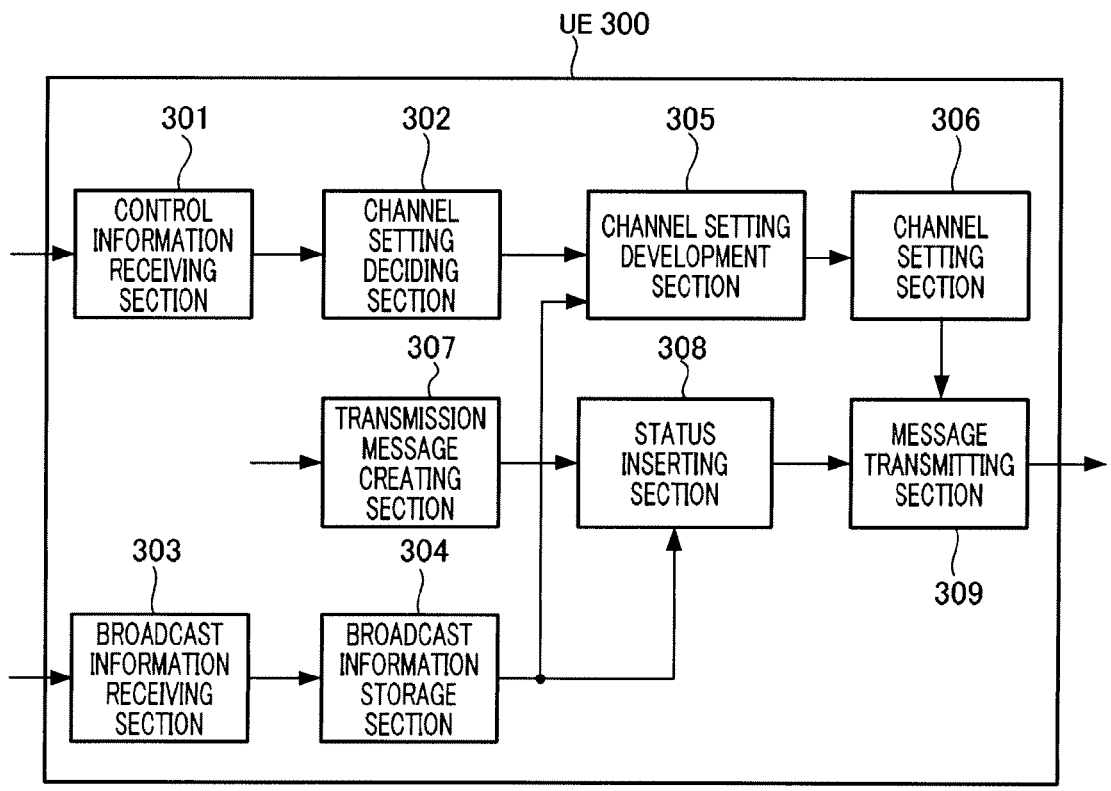
FIG. 11 is a block diagram showing the configuration of a UE according to Embodiment 1 of the present invention.

FIG. 11 is a block diagram showing the configuration of UE 300 according to Embodiment 1 of the present invention. In this figure, control information receiving section 301 receives the control information transmitted from node B 200 shown in FIG. 6, applies predetermined reception processing to the received control information, and outputs the control information after the reception processing to channel setting deciding section 302.

Channel setting deciding section 302 decides the channel setting information from the control information outputted from control information receiving section 301, and, when the control information includes an index, extracts the index, and, when the control information includes channel setting information itself, extracts the channel setting information, and outputs the extracted index or channel setting information to channel setting development section 305.

Broadcast information receiving section 303 receives the broadcast information transmitted from node B 200 shown in FIG. 6, applies predetermined reception processing to the received broadcast information and outputs the broadcast information after the reception processing, to broadcast information storage section 304.

Broadcast information storage section 304 stores the PLMN level information and the cell level information included in the broadcast information outputted from broadcast information receiving section 303 and outputs the information to channel setting development section 305 and status inserting section 308.

When an index is outputted from channel setting deciding section 302, channel setting development section 305 reads the corresponding configuration from broadcast information storage section 304 per PLMN level and cell level, and outputs the read configurations to channel setting section 306. Furthermore, when channel setting information is outputted from channel setting deciding section 302, channel setting development section 305 directly outputs the channel setting information to channel setting section 306.

Channel setting section 306 makes a channel setting based on the configuration or channel setting information outputted from channel setting development section 305 and reflects the channel setting in message transmitting section 309.

Transmission message creating section 307 creates a transmission message to the node B and outputs the created message to status inserting section 308.

Status inserting section 308 inserts, per PLMN level and cell level, a status showing that the preconfiguration information is stored in broadcast information storage section 304 in the transmission message outputted from transmission message creating section 307, and outputs the transmission message in which statuses are inserted, to message transmitting section 309.

As this status information, in addition to the flag showing whether or not the preconfiguration information is held, if the version of the preconfiguration information has been received together with the preconfiguration information, the details can also be added.

Message transmitting section 309 applies predetermined transmission processing to the message outputted from status inserting section 308 and transmits the message after the transmission processing to the node B using the channel set up in channel setting section 306.

Figure 12:
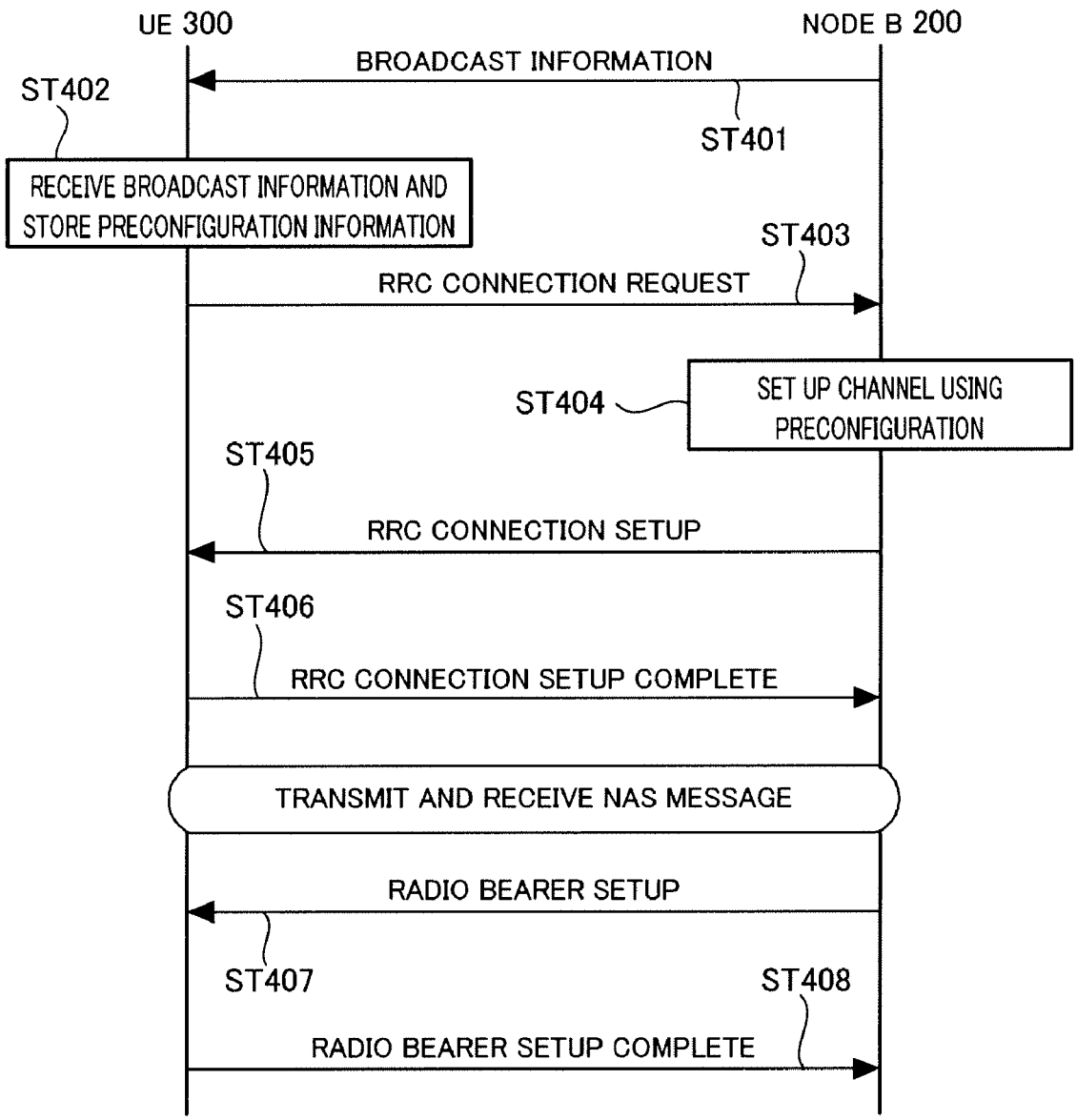
FIG. 12 is a sequence diagram showing an outline of call connection steps for the node B shown in FIG. 6 and the UE shown in FIG. 11.

Next, an outline of call connection steps for node B 200 shown in FIG. 6 and UE 300 shown in FIG. 11 will be explained using FIG. 12. In FIG. 12, node B 200 broadcasts the preconfiguration information of the operator's RB/TrCH and the preconfiguration information to UE 300 through broadcast information in ST401, and UE 300 receives the broadcast information and stores the preconfiguration information included in the received broadcast information in ST402.

In ST403, UE 300 reports that the PLMN level information and the cell level information are stored, that is, UE 300 reports the status of UE 300 to node B 200 using an RRC connection request message. As shown in FIG. 14, the RRC connection request message reports the PLMN level status as the PLMN preconfiguration status and the cell level status as the cell preconfiguration status using "true" (hold) or "false" (not hold).

In ST404, node B 200 sets up a channel using the preconfiguration, and, in ST405, node B 200 transmits to UE 300, an RRC connection setup message including the PLMN level index and the cell level index showing the channel setting information set up in ST404. For reference, FIG. 15 shows an image of the RRC connection setup message.

In ST406, UE 300 transmits an RRC connection setup complete message to node B 200 in response to the RRC connection setup message, and transmits and receives an NAS message to/from node B 200.

In ST407, node B 200 transmits to UE 300, the radio bearer setup message including the PLMN level index and cell level index showing the channel setting information, and, in ST408, UE 300 transmits a radio bearer setup complete message to node B 200 in response to the radio bearer setup message.

As described above, according to Embodiment 1, it is possible to reduce the size of messages in call connection by providing two layers of preconfiguration information where the configurations of an RB and a TrCH having different setting per PLMN and the configurations of a PhyCH having different setting per cell are assigned respective indexes, and by adopting a preconfiguration per PLMN level and cell level.

Although a case has been described with the present embodiment where indexes corresponding to the PLMN level and cell level are provided, when, for example, only PhyCH information managed at the cell level is changed, it is also possible to transmit only the index of the changed information. Furthermore, instead of managing information managed at the PLMN level using one index, it is also possible to manage indexes of the RB and indexes of the TrCH separately and use the indexes of the RB when only the RB is changed, for example.

Further, although a case has been described with the present embodiment where the operation for establishing a call using FIG. 12 is performed, different operations are possible in different cases. For example, a case is possible where no communication is carried out for a while after the UE establishes a packet call and the UE changes its state to a power saving state. In the power saving state, even when communication is restarted or when the UE moves to another cell, the present embodiment is equally applicable. To be more specific, as shown in FIG. 13, in communication steps between the UE and the node B, status information set up as the RRC connection request message this time is set up as the cell update (or URA update) message used for reconnection, and the index shown by the node B in the RRC connection setup message is included in the cell update confirm (URA update confirm) message.

Figure 16:
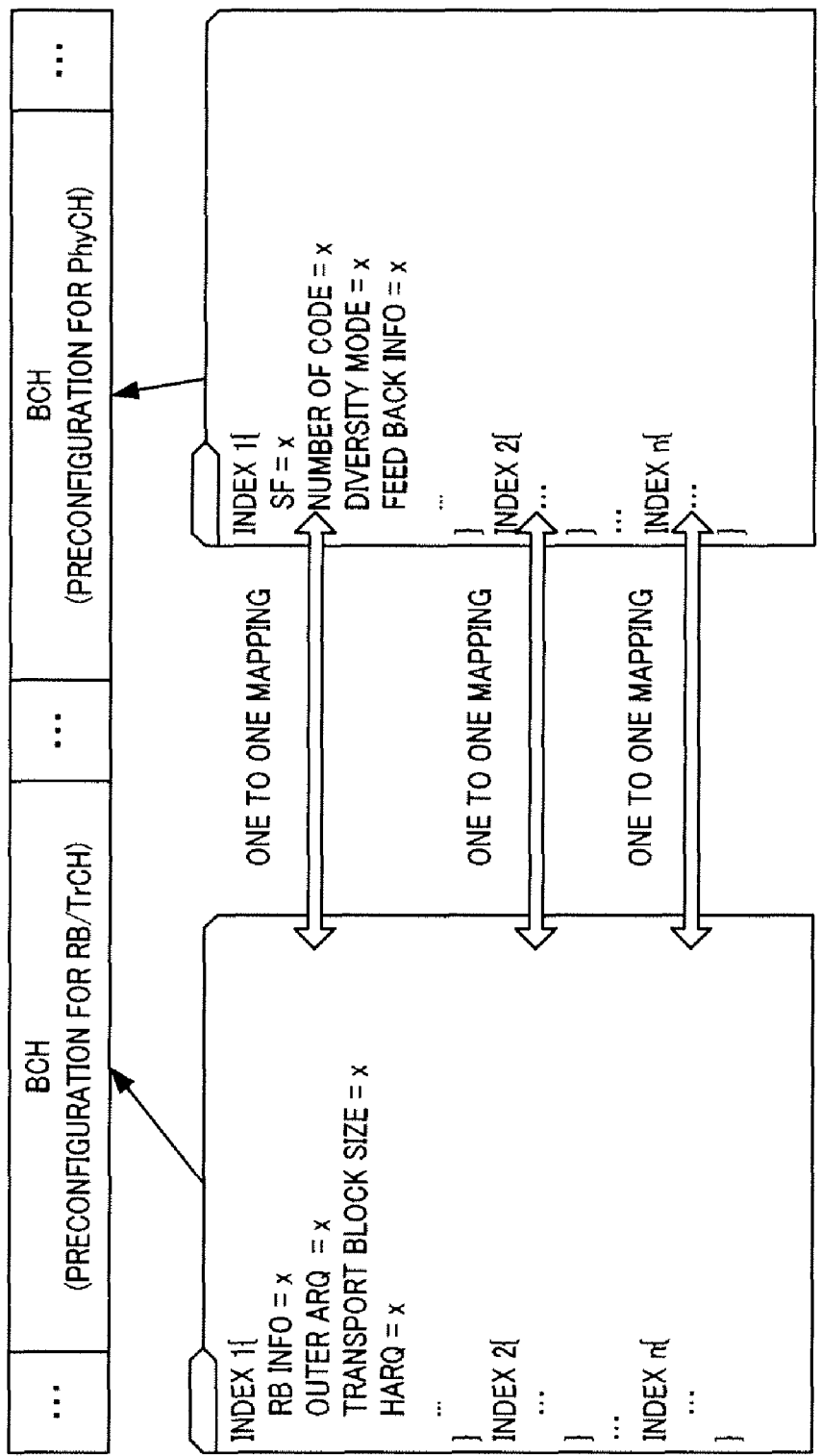
FIG. 16 illustrates a state where PLMN level information and cell level information are associated in one-to-one mapping.
Figure 17:
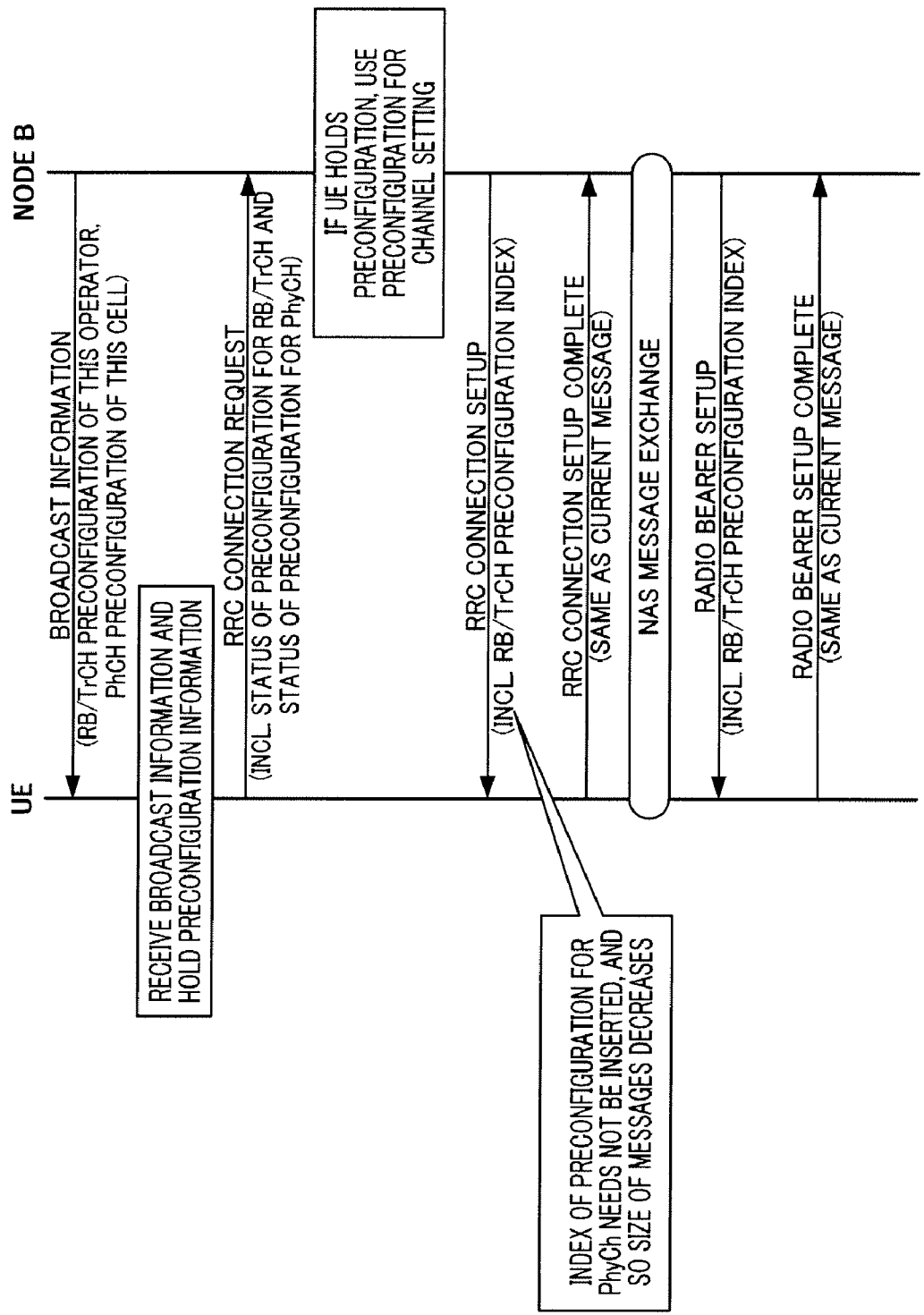
FIG. 17 is a sequence diagram showing an outline of call connection steps upon adopting the one-to-one mapping shown in FIG. 16.

Further, although a case has been described with the present embodiment where PLMN level preconfigurations and cell level preconfigurations are independent from each other, PLMN level preconfigurations and cell level preconfigurations may be defined such that selecting one of the PLMN level preconfigurations will determine what is selected in the cell level preconfigurations. That is, as shown in FIG. 16, the PLMN level preconfiguration indexes and the cell level preconfiguration indexes are associated in one-to-one mapping. In this case, only one of these indexes needs to be reported, and so the call connection steps shown in FIG. 17 are adopted.

Figure 18:
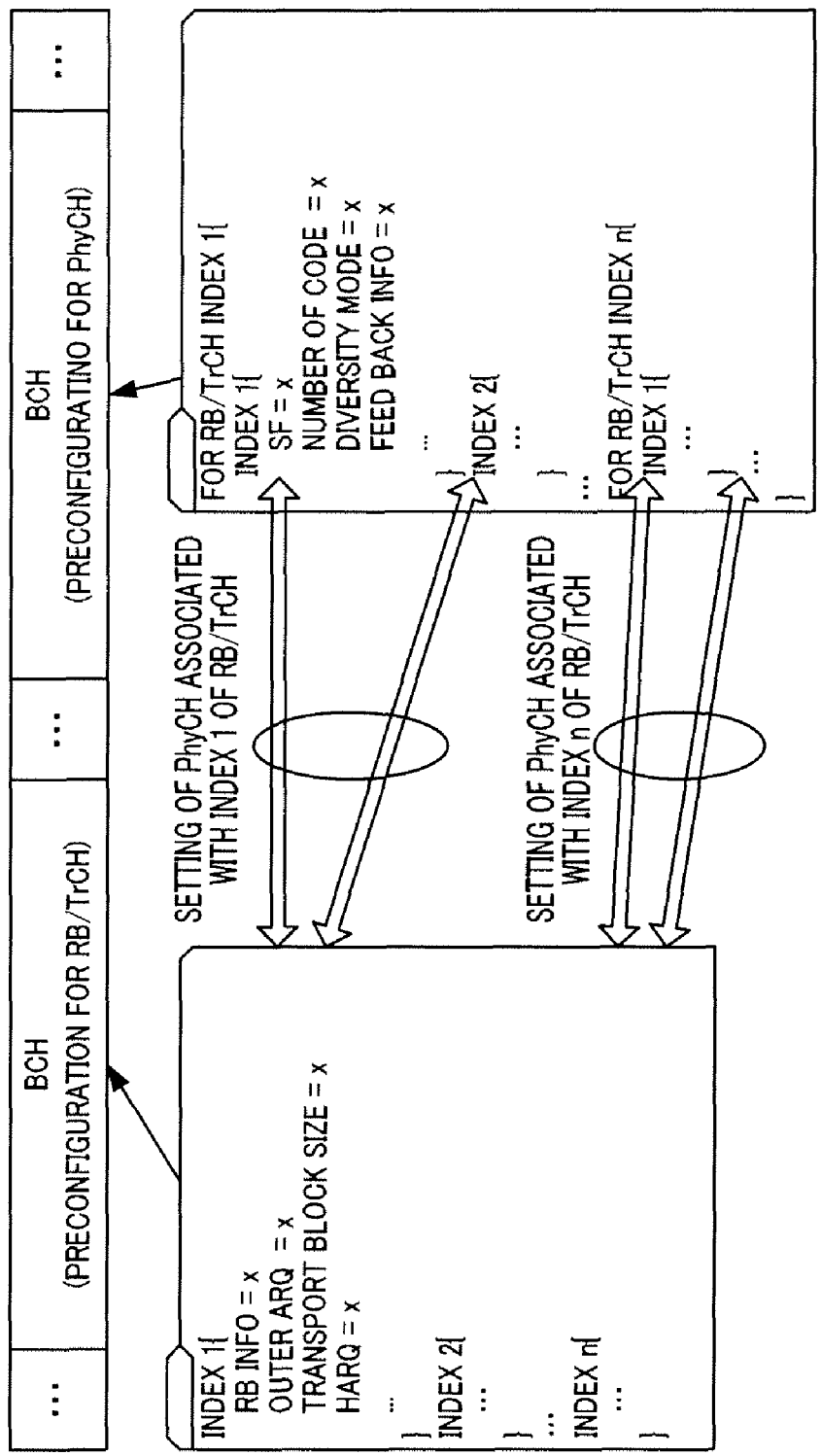
FIG. 18 illustrates a state where PLMN level information and cell level information are associated by one-to-many mapping.

Further, unless one-to-one mapping is implemented as shown in FIG. 16, cases are possible where, once one of the PLMN level preconfigurations is selected, candidates of the cell level preconfiguration corresponding to the determined preconfiguration are be limited. In this case, by taking into account the setting of cell level preconfigurations in association with the PLMN level preconfiguration indexes, it is possible to reduce the index for use of the cell level preconfiguration. FIG. 18 illustrates an example of this case.

Further, although a case has been described with the present embodiment where the node B manages a plurality of preconfigurations (at a PLMN level and at a cell level), the node B may manage the cell level preconfigurations and a higher node may manage the PLMN level preconfigurations.

Further, according to the present embodiment, although a cell level preconfiguration is defined to process different information per node B, it is equally possible to use other definitions. To be more specific, it is equally possible to define and manage information for communication between the node B and the UE as the cell level preconfiguration. In this case, transmitting held information of all preconfigurations at a time and transmitting the information little by little are possible. For example, to merely establish connection between the UE and the node B at first, only the receiving state of the cell level preconfigurations needs to be reported. Further, it is possible to finally establish a call by reporting the holding state of PLMN level preconfigurations after the connection is established between the UE and the node B.

Embodiment 2

Figure 19:
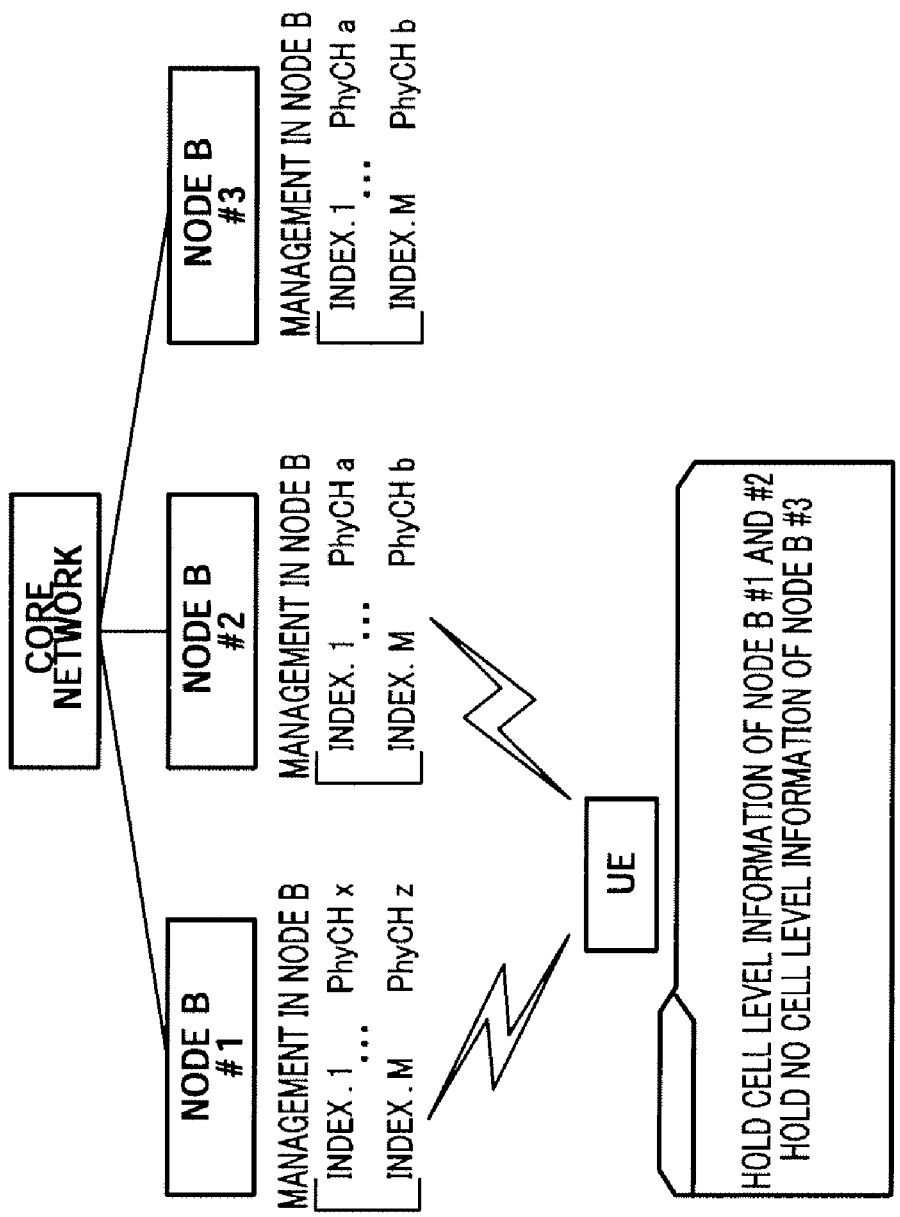
FIG. 19 shows how the UE communicates with a plurality of nodes B.

Although a case has been described with Embodiment 1 where the UE holds cell level information of one cell, Embodiment 2 of the present invention will describe a case where the UE holds cell level information of a plurality of cells, as shown in FIG. 19.

Figure 20:
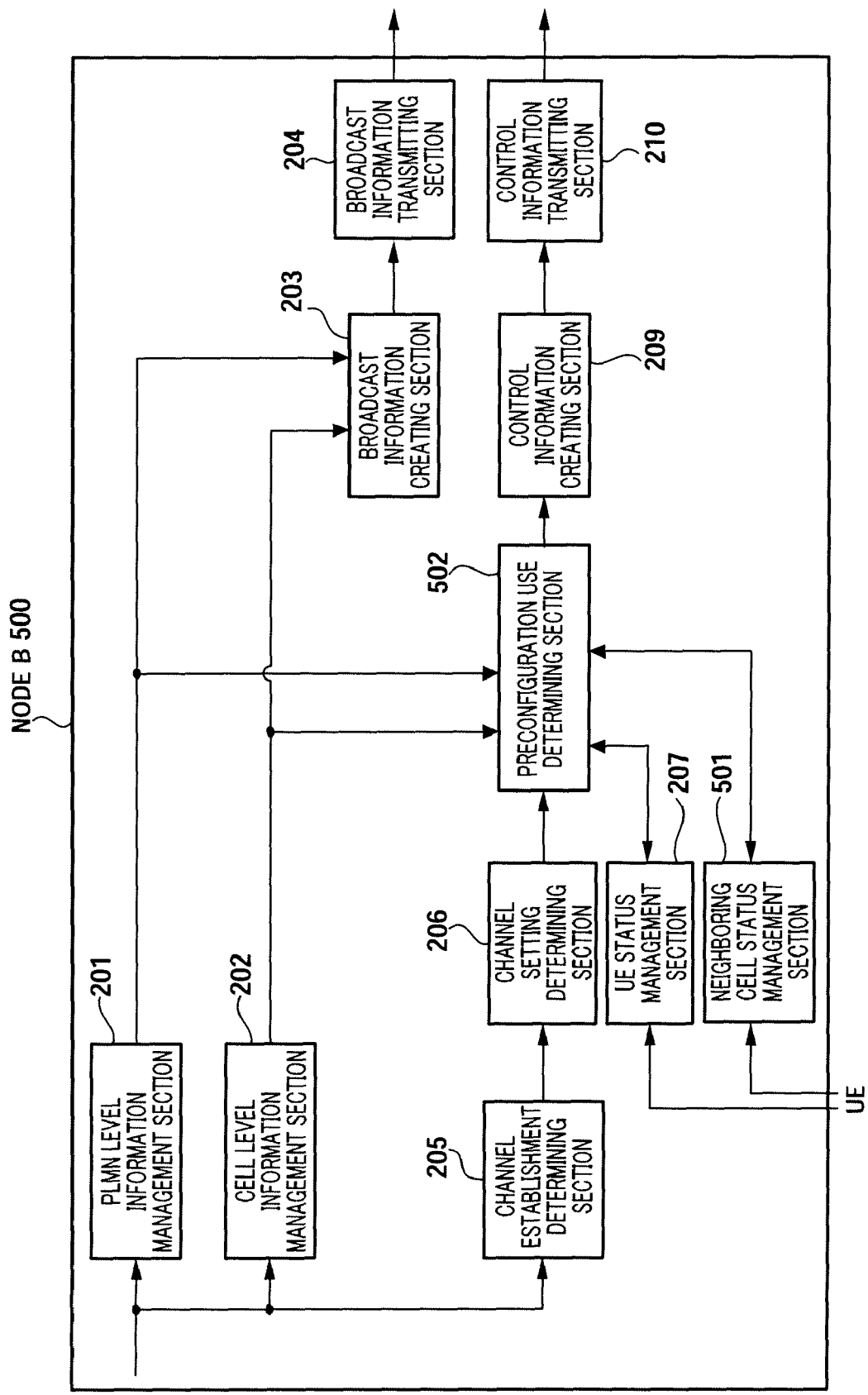
FIG. 20 is a block diagram showing the configuration of the node B according to Embodiment 2 of the present invention.

FIG. 20 is a block diagram showing the configuration of node B 500 according to Embodiment 2 of the present invention. FIG. 20 differs from FIG. 6 in adding neighboring cell status management section 501 and replacing preconfiguration use determining section 208 by preconfiguration use determining section 502.

In FIG. 20, neighboring cell status management section 501 acquires the status as to whether or not the UE holds the PLMN information and cell level information of neighboring cells from the UE, and manages the acquired status and ID of the UE. Further, upon receiving a UE status report request from preconfiguration use determining section 502, neighboring cell status management section 501 sends back the corresponding status to preconfiguration use determining section 502. If the version of the preconfiguration information has been received together with the preconfiguration information, this status information may include details of the version in addition to a flag showing whether or not the preconfiguration information is held.

When the UE moves to a neighboring cell and preconfiguration use determining section 502 commands the UE to perform a handover, preconfiguration use determining section 502 decides whether or not the UE can finally use the preconfiguration of the neighboring cell based on the neighboring cell status of the UE acquired from neighboring cell status management section 501. When the UE can use the preconfiguration of the neighboring cell, preconfiguration use determining section 502 outputs the index of the corresponding PLMN level and the index of the corresponding cell level to control information creating section 209. When the UE cannot use the preconfiguration, preconfiguration use determining section 502 outputs channel setting information itself outputted from channel setting determining section 206 to control information creating section 209.

Figure 21:
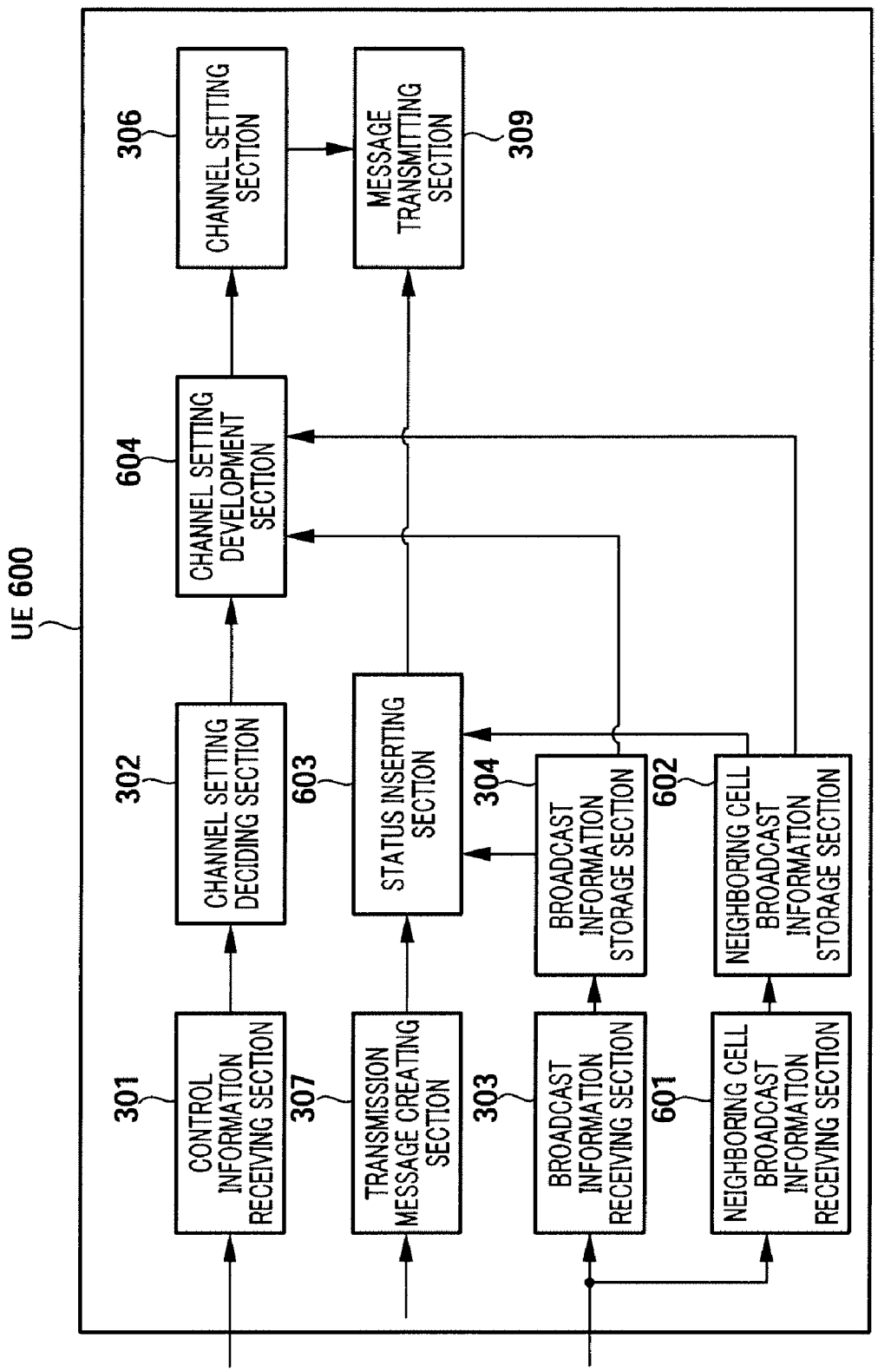
FIG. 21 is a block diagram showing the configuration of a UE according to Embodiment 2 of the present invention.

FIG. 21 is a block diagram showing the configuration of UE 600 according to Embodiment 2 of the present invention. FIG. 21 differs from FIG. 11 in that neighboring cell broadcast information receiving section 601 and neighboring cell broadcast information storage section 602 are added, status inserting section 308 is replaced by status inserting section 603 and channel setting development section 305 is replaced by channel setting development section 604.

Neighboring cell broadcast information receiving section 601 receives broadcast information transmitted from a neighboring cell other than the current cell, applies predetermined reception processing to the received broadcast information and outputs the broadcast information after the reception processing to neighboring cell broadcast information storage section 602.

Neighboring cell broadcast information storage section 602 stores the PLMN level information and the cell level information included in the broadcast information outputted from neighboring cell broadcast information receiving section 601, and outputs the information to status inserting section 603 and channel setting development section 604.

Status inserting section 603 inserts, per PLMN level and cell level, the status as to whether or not preconfiguration information is stored in broadcast information storage section 304 and the status as to whether or not preconfiguration information of a neighboring cell is stored in neighboring cell broadcast information storage section 602 into a transmission message outputted from transmission message creating section 307, and outputs the transmission message in which the status is inserted to message transmitting section 309.

Channel setting development section 604 reads the configuration corresponding to the index outputted from channel setting deciding section 302 from broadcast information storage section 304 per PLMN level and cell level, and outputs the read configuration to channel setting section 306. Furthermore, when the result outputted from channel setting deciding section 302 is cell level information of the neighboring cell, channel setting development section 604 reads the cell level information of the neighboring cell which is the configuration corresponding to the set index from neighboring cell broadcast information storage section 602, and outputs the read cell level information to channel setting section 306.

Next, an outline of communication steps, when UE 600 shown in FIG. 18 performs a handover, will be explained using FIG. 19. In FIG. 19, UE 600 and node B 500 are communicating with each other, in ST701, UE 600 receives broadcast information from the current cell and its neighboring cell, and, in ST702, node B 500 transmits to UE 600 a measurement control message for requesting measurement of received quality of the neighboring cell.

In ST703, UE 600 measures the received quality of the neighboring cell (measurement), checks whether or not preconfiguration information of the measured neighboring cell is held, and, in ST704, UE 600 transmits the measurement result of the received quality of the neighboring cell and the status of the neighboring cell to node B 500 in a measurement report message. As shown in FIG. 20, the measurement report message reports the neighboring cell status using "true" (hold) or "false" (not hold) as a cell preconfiguration status.

In ST705, when node B 500 decides that the received quality in UE 600 in the neighboring cell is better than in the current cell, node B 500 decides to make UE 600 perform a handover, decides whether or not UE 600 holds the preconfiguration information of the handover destination cell, from the neighboring cell status, and determines to use the preconfiguration.

In ST706, node B 500 transmits a physical channel reconfiguration message to UE 600 to designate a handover and report a cell level index of the neighboring cell, and, in ST707, UE 600 transmits a physical channel reconfiguration complete message to node B 500 in response to the physical channel reconfiguration message.

Here, it is assumed that the measurement control message transmitted in ST702 is the same as in a conventional manner. However, for extension, the measurement control information can also include information on the preconfiguration. For example, by including information specifying the version of the preconfiguration in the measurement control message, it is possible to check whether or not the preconfiguration information held in the UE is the latest one. When the UE holds the latest preconfiguration information, processing such as deleting the information may be carried out.

As described above, according to Embodiment 2, the UE acquires preconfiguration information of the neighboring cell and receives the index showing cell level information of the neighboring cell from the node B upon a handover to the neighboring cell, so that it is possible to reduce the size of messages during a handover.

Figure 24:
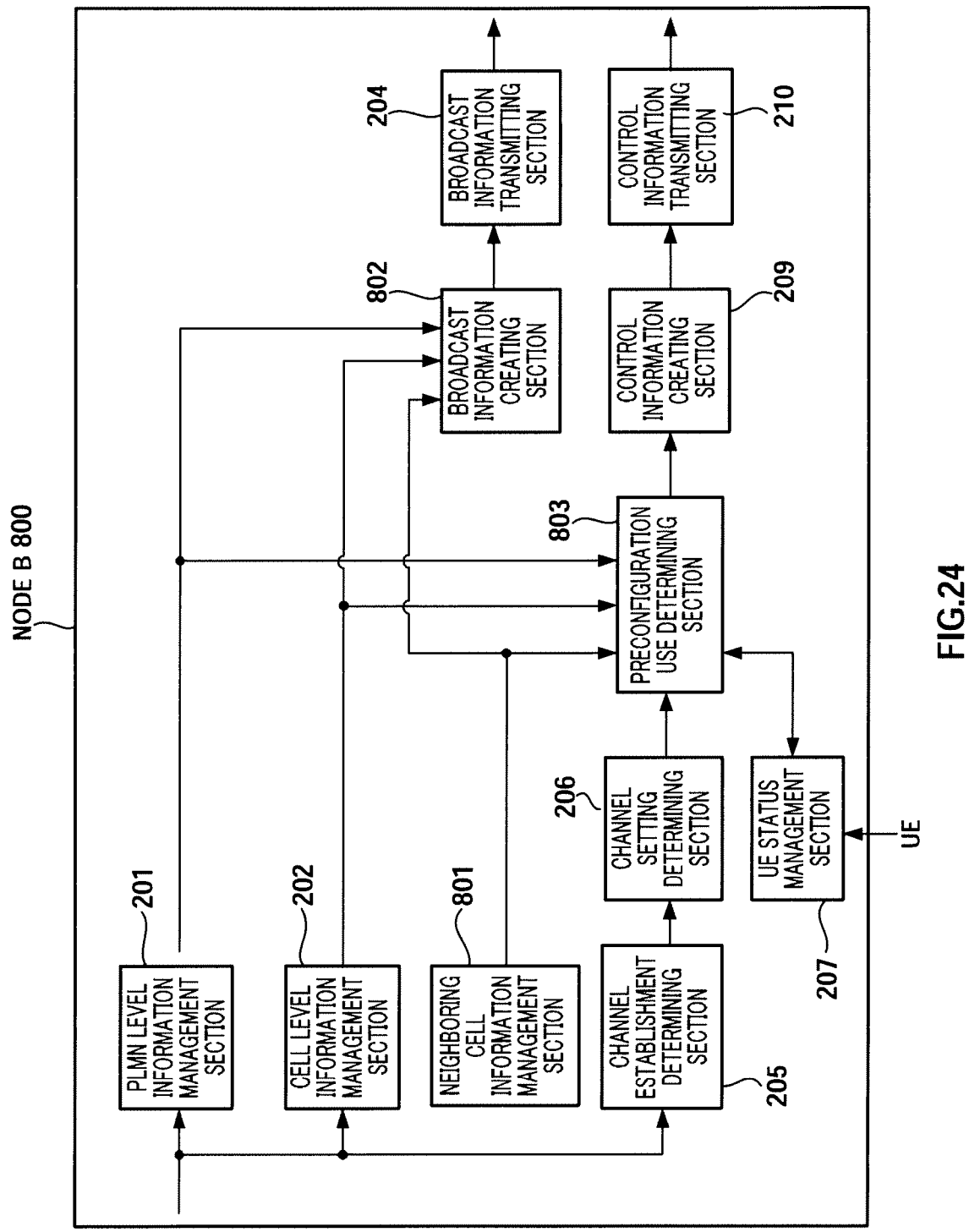
FIG. 24 is a block diagram showing the configuration of the node B according to Embodiment 3 of the present invention.
Figure 25:
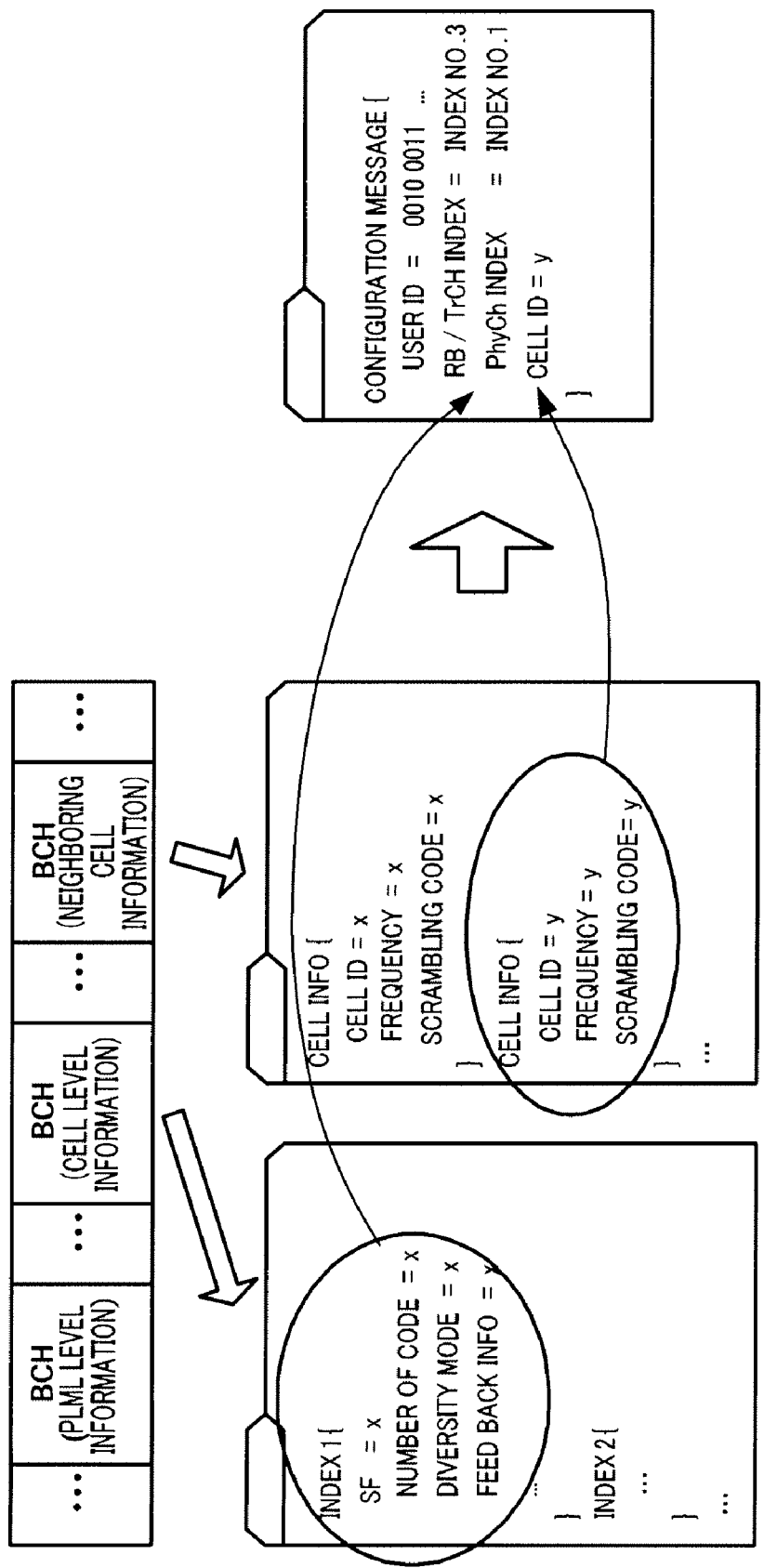
FIG. 25 shows how control information is created from cell level information of a cell and its neighboring cell information.

FIG. 24 is a block diagram showing the configuration of node B 800 according to Embodiment 3 of the present invention. FIG. 24 differs from FIG. 6 in that neighboring cell information management section 801 is added, broadcast information creating section 203 is replaced by broadcast information creating section 802 and preconfiguration use determining section 208 is replaced by preconfiguration use determining section 803.

In FIG. 24, neighboring cell information management section 801 manages information needed to identify a cell such as the frequency band and scrambling code (hereinafter "neighboring cell information") and outputs the neighboring cell information that is managed to broadcast information creating section 802 and preconfiguration use determining section 803.

Broadcast information creating section 802 creates broadcast information including the PLMN level information outputted from PLMN level information management section 201, the cell level information outputted from cell level information management section 202 and the neighboring cell information outputted from neighboring cell information management section 801 and outputs the created broadcast information to broadcast information transmitting section 204.

Preconfiguration use determining section 803 decides whether or not the channel setting information outputted from channel setting determining section 206 is included in any of the PLMN level information outputted from PLMN level information management section 201, the cell level information outputted from cell level information management section 202 and the neighboring cell information outputted from neighboring cell information management section 801. When the channel setting information is included in these information, preconfiguration use determining section 803 decides per PLMN level and cell level, whether or not the UE can finally use the preconfiguration, based on the UE status acquired from UE status management section 207. If the UE can use the preconfiguration, preconfiguration use determining section 803 outputs both or one of the corresponding PLMN level index and the cell level index to control information creating section 209. On the other hand, if the UE cannot use the preconfiguration, preconfiguration use determining section 803 outputs the channel setting information itself to control information creating section 209.

Figure 22:
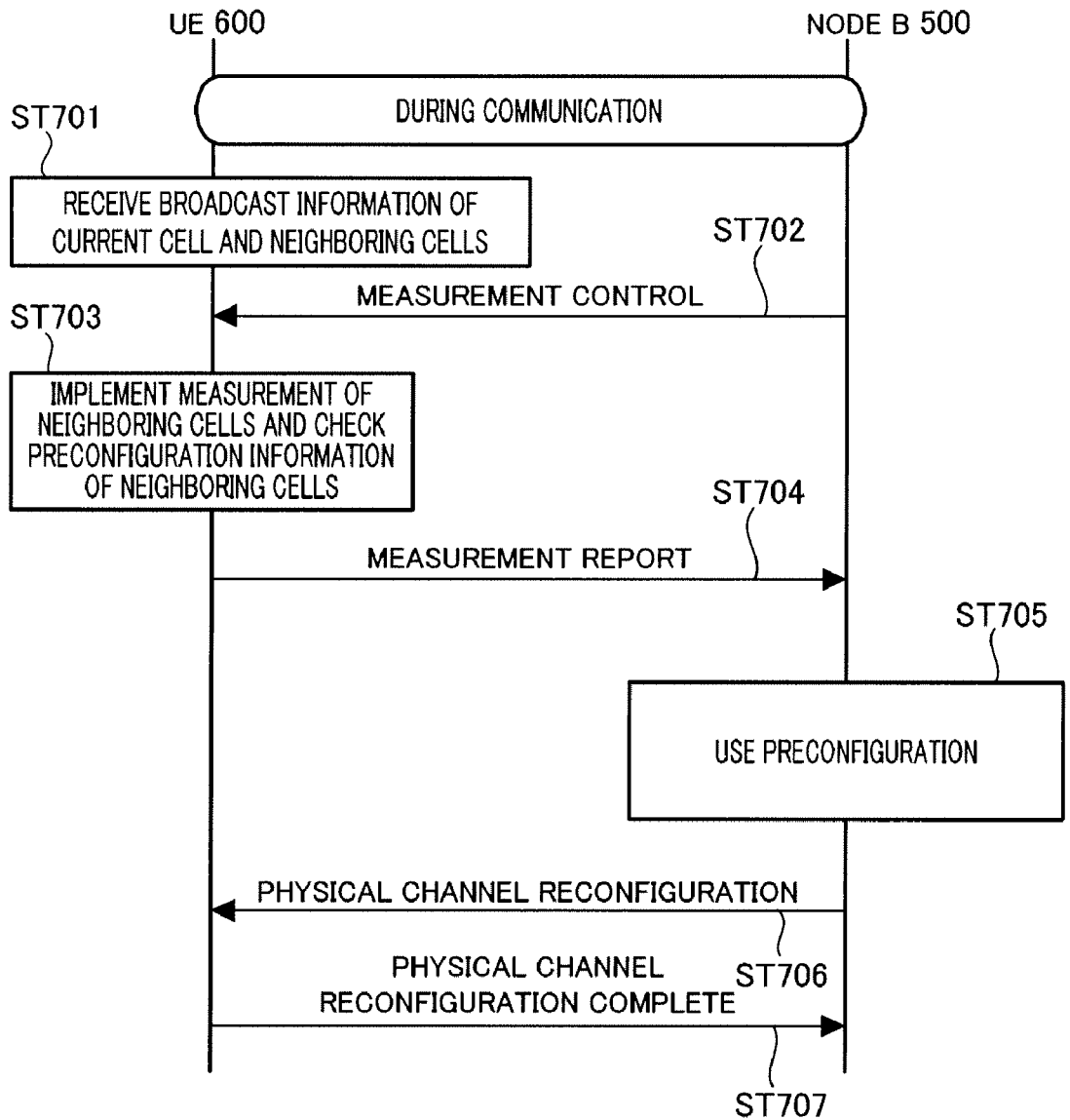
FIG. 22 is a sequence diagram showing an outline of communication steps when the UE shown in FIG. 18 performs a handover.

If preconfiguration use determining section 803 decides that the only difference in the configuration information between the current cell and its neighboring cell is the neighboring cell information, control information creating section 209 cerates control information by combining the cell level information and the neighboring cell information as shown in FIG. 22 and outputs the created control information to control information transmitting section 210.

Figure 26:
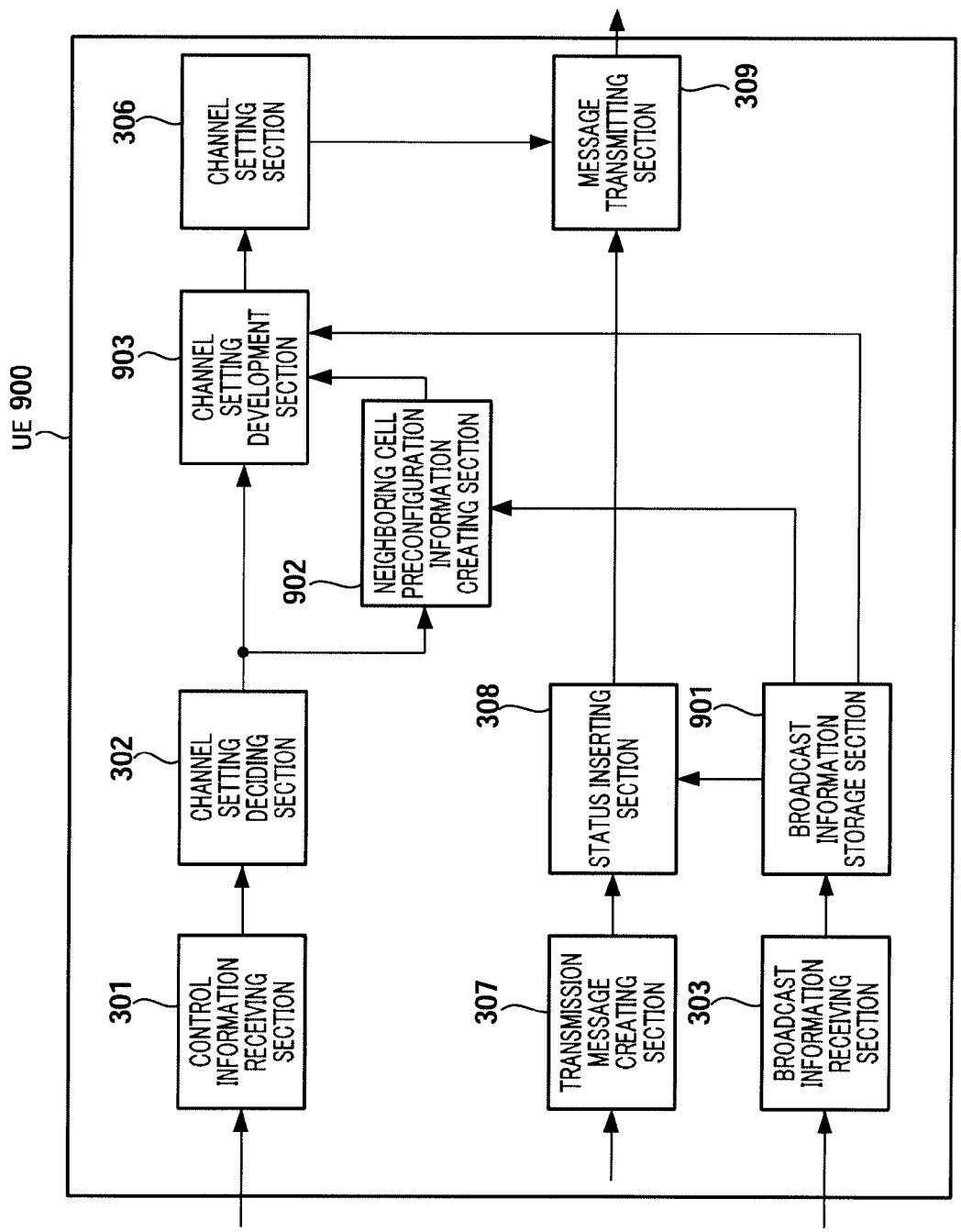
FIG. 26 is a block diagram showing the configuration of a UE according to Embodiment 3 of the present invention.
Figure 27:
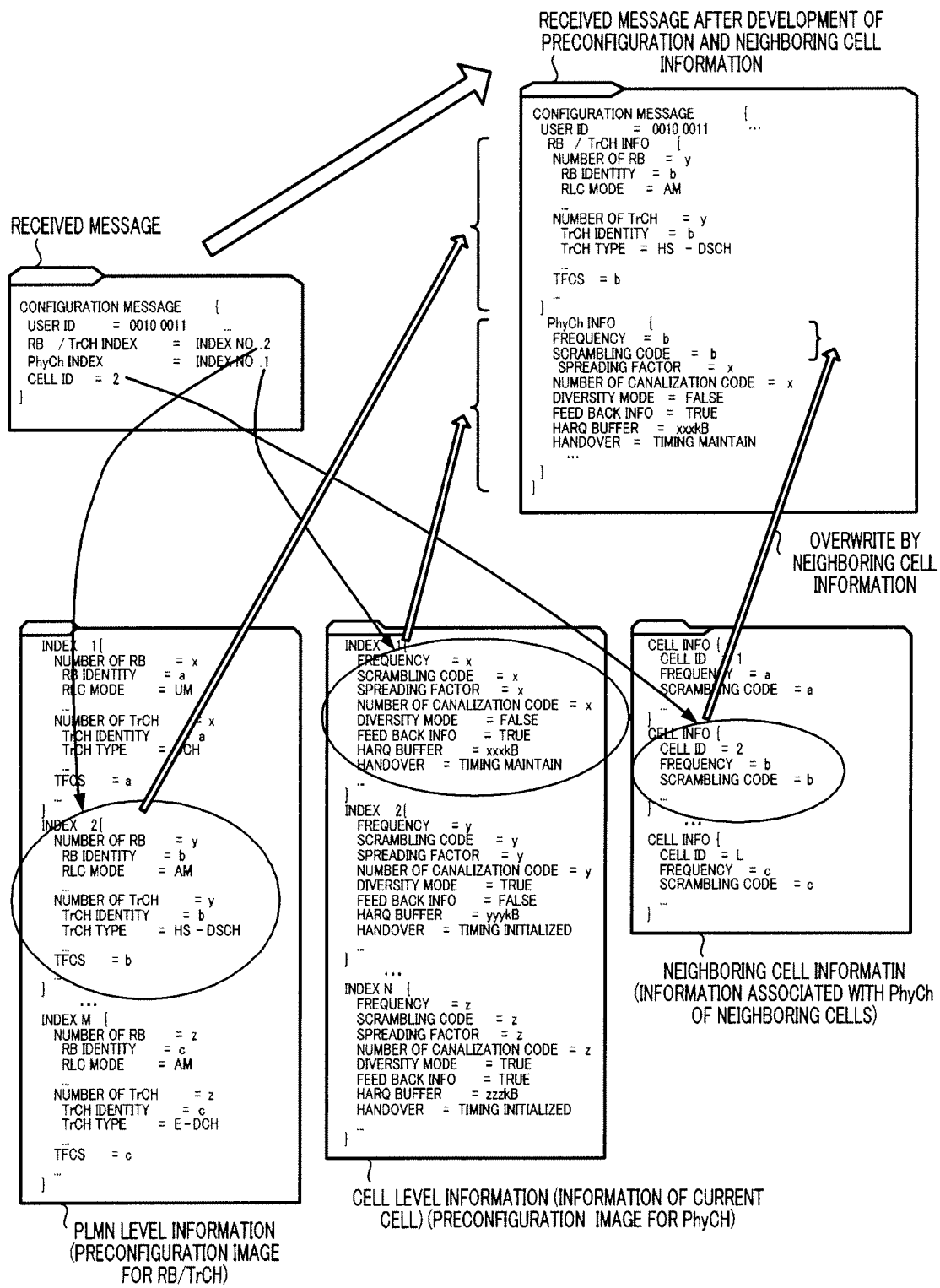
FIG. 27 shows how channel setting information is developed.

FIG. 26 is a block diagram showing the configuration of UE 900 according to Embodiment 3 of the present invention. FIG. 26 differs from FIG. 11 in that neighboring cell preconfiguration information creating section 902 is added, broadcast information storage section 304 is replaced by broadcast information storage section 901 and channel setting development section 305 is replaced by channel setting development section 903.

In FIG. 26, broadcast information storage section 901 stores the PLMN level information, the cell level information and the neighboring cell information included in the broadcast information outputted from broadcast information receiving section 303, outputs the PLMN level information and the cell level information to channel setting development section 903, and the neighboring cell information to neighboring cell preconfiguration information creating section 902. Furthermore, a status showing whether or not those information are stored is outputted to status inserting section 308.

Neighboring cell preconfiguration information creating section 902 reads cell level information corresponding to the cell level index outputted from channel setting deciding section 302 and neighboring cell information corresponding to a cell ID outputted from channel setting deciding section 302, from broadcast information storage section 901, and creates preconfiguration information of the neighboring cell according to the read cell level information and neighboring cell information. The created preconfiguration information is outputted to channel setting development section 903.

Channel setting development section 903 reads the PLMN level information corresponding to the PLMN level index outputted from channel setting deciding section 302 from broadcast information storage section 901, develops channel setting information from the read PLMN level information and the preconfiguration information of the neighboring cell outputted from neighboring cell preconfiguration information creating section 902, and outputs the developed channel setting information to channel setting section 306.

A state will be explained using FIG. 24 where the channel setting information is developed based on the control information received by UE 900 in the above-described configuration. Channel setting deciding section 302 outputs the PLMN level index (index No. 2) from the received message to channel setting development section 903 and outputs the cell level index (index No. 1) and the cell ID(=2) to neighboring cell preconfiguration information creating section 902.

Neighboring cell preconfiguration information creating section 902 reads the cell level information corresponding to the cell level index No. 1 and the neighboring cell information corresponding to the cell ID=2 from broadcast information storage section 901, overwrites the read cell level information with the neighboring cell information, creates preconfiguration information of the neighboring cell and outputs the created neighboring cell preconfiguration information to channel setting development section 903.

Channel setting development section 903 reads the PLMN level information corresponding to the PLMN level index No. 2 from broadcast information storage section 901, and, by combining the read PLMN level information and the neighboring cell preconfiguration information, develops channel setting information of the neighboring cell.

In this way, according to Embodiment 3, when the UE is made to perform a handover to the neighboring cell having the same PhyCH setting as the current cell, neighboring cell information for identifying a cell neighboring the current cell is included in broadcast information, and the UE creates cell level information of the neighboring cell using the cell level information of the current cell and the neighboring cell information, so that it is possible to perform a handover to the neighboring cell without acquiring broadcast information from the neighboring cell.

Embodiment 4

Embodiment 4 of the present invention focuses on the fact that all data is transmitted in the shared channel in long term evolution ("LTE"), and will describe a case where a cell level is further divided into two types.

In Embodiment 1, the PLMN level network includes the QoS class, the channel radio access bearer identifier, information about PDCP (header compression), the ciphering or integrity setting, the logical channel setting, the setting/number of retransmissions/reception window size of outer ARQ, the method of sending information for retransmission, a parameter/DRX/DTX interval to implement a DRX/DTX, and the method of reporting a measurement result of the volume of traffic.

Further, the cell level network includes the available frequency band, the format/TTI/interleave length/coding rate of channel (which are finally determined by a scheduler and of which candidates may not be set up), the transmission method/transmission frequency/quality measurement unit of quality report for downlink scheduling, the transmission method of a resource request for uplink scheduling, and the setting of MIMO.

Here, the cell level is further divided into two types taking into account the LTE characteristic that all data is transmitted in the shared channel. One divided cell levels is information that is changed and added when a channel is added, such as information that needs to be changed when QoS changes. To be more specific, the information refers to the frequency of CQI, the method of HARQ and so on. The other divided cell levels is information that is not changed and added when a channel is added, such as information that needs not be changed when the cell does not change, like frequency information. By managing these two types of information individually, it is possible to further reduce the amount of data to be transmitted as the preconfiguration.

Thus, the concept underlying the cell level classification is to classify information having different influence on layers, and QoS is one specific example.

Figure 28:
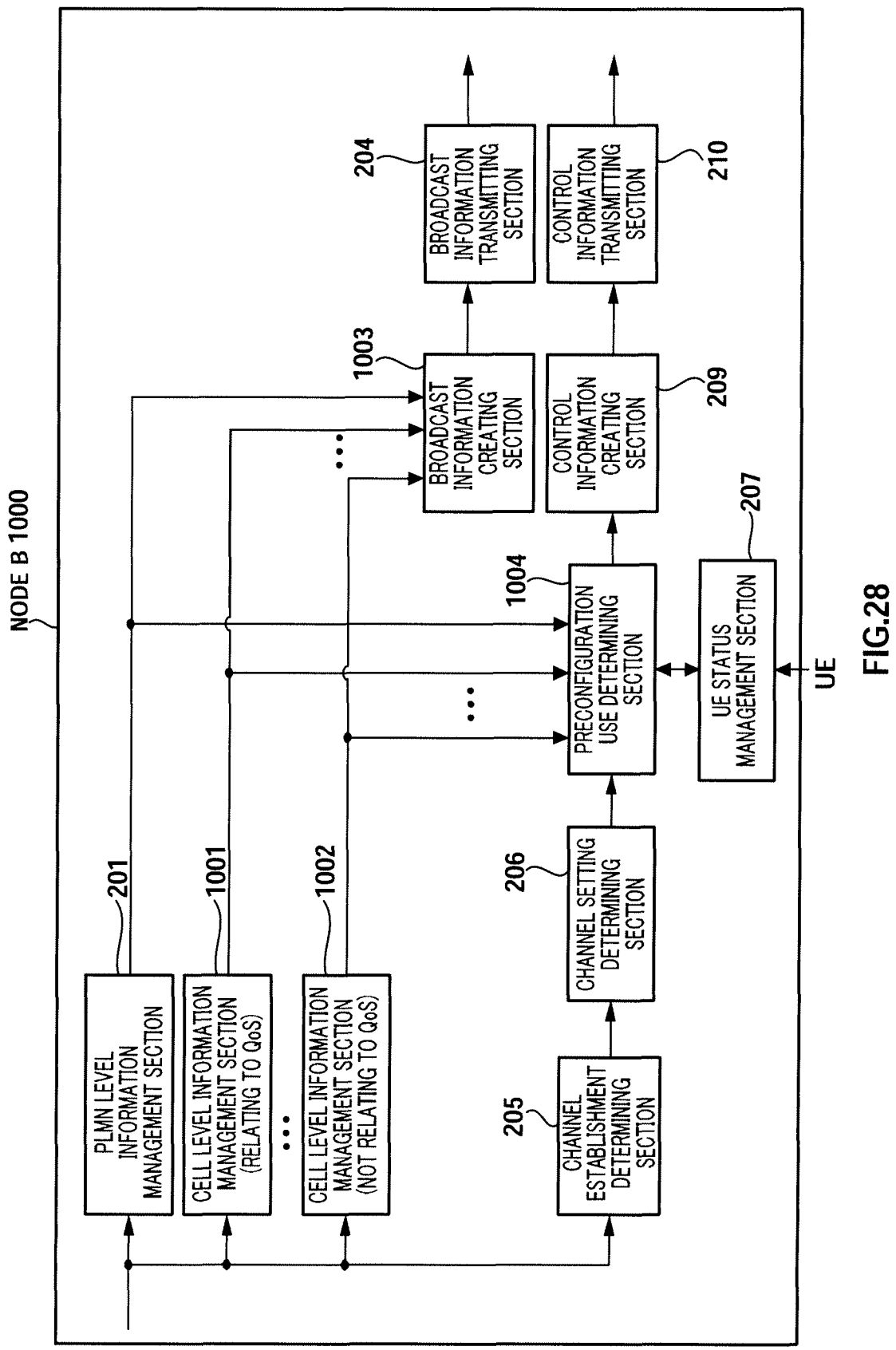
FIG. 28 is a block diagram showing a configuration of the node B according to Embodiment 4 of the present invention.

FIG. 28 is a block diagram showing the configuration of node B 1000 according to Embodiment 4 of the present invention. FIG. 28 differs from FIG. 6 in replacing cell level information management section 202 by cell level information management section 1001 and cell level information management section 1002, broadcast information creating section 203 by broadcast information creating section 1003, and preconfiguration use determining section 208 by preconfiguration use determining section 1004.

Cell level information management section 1001 manages details of setting depending on the channel provided to the UE. To be more specific, cell level information management section 1001 manages frequency of transmissions of the CQI reporting message, frequency of transmissions of the resource request message, and the number of retransmissions/retransmission delay of HARQ. These sets of information vary between using voice over IP ("VoIP"), performing web browsing, and transmitting and receiving email. Therefore, every time a channel is set up, information available for the service provided in the channel needs to be selected. Here, every time a channel is added as described above, information that should be set up depending on the channel is managed.

Cell level information management section 1002 manages details of setting that does not depend on the type of the channel provided to the UE. To be more specific, cell level information management section 1002 manages information such as frequency information, scrambling code (pattern) information and radio resource block mapping information. These sets of information need not be changed when a new channel is added. Consequently, once these sets of information are set up, the information need not be set up newly even when a channel is added. Here, cell level information management section 1002 manages information that needs not be newly set up for the UE every time a channel is added as described above.

Broadcast information creating section 1003 acquires the level information outputted from PLMN level information management section 201 and cell level information management sections 1001 and 1002, and creates broadcast information including the acquired level information. As shown in FIG. 29, the broadcast information created as above includes preconfiguration information not relating to QoS and preconfiguration information relating to QoS.

Preconfiguration use determining section 1004 acquires the cell level information outputted from PLMN level information management section 201 and cell level information management sections 1001 and 1002, and performs a channel setting using the acquired cell level information (preconfiguration information).

Figure 30:
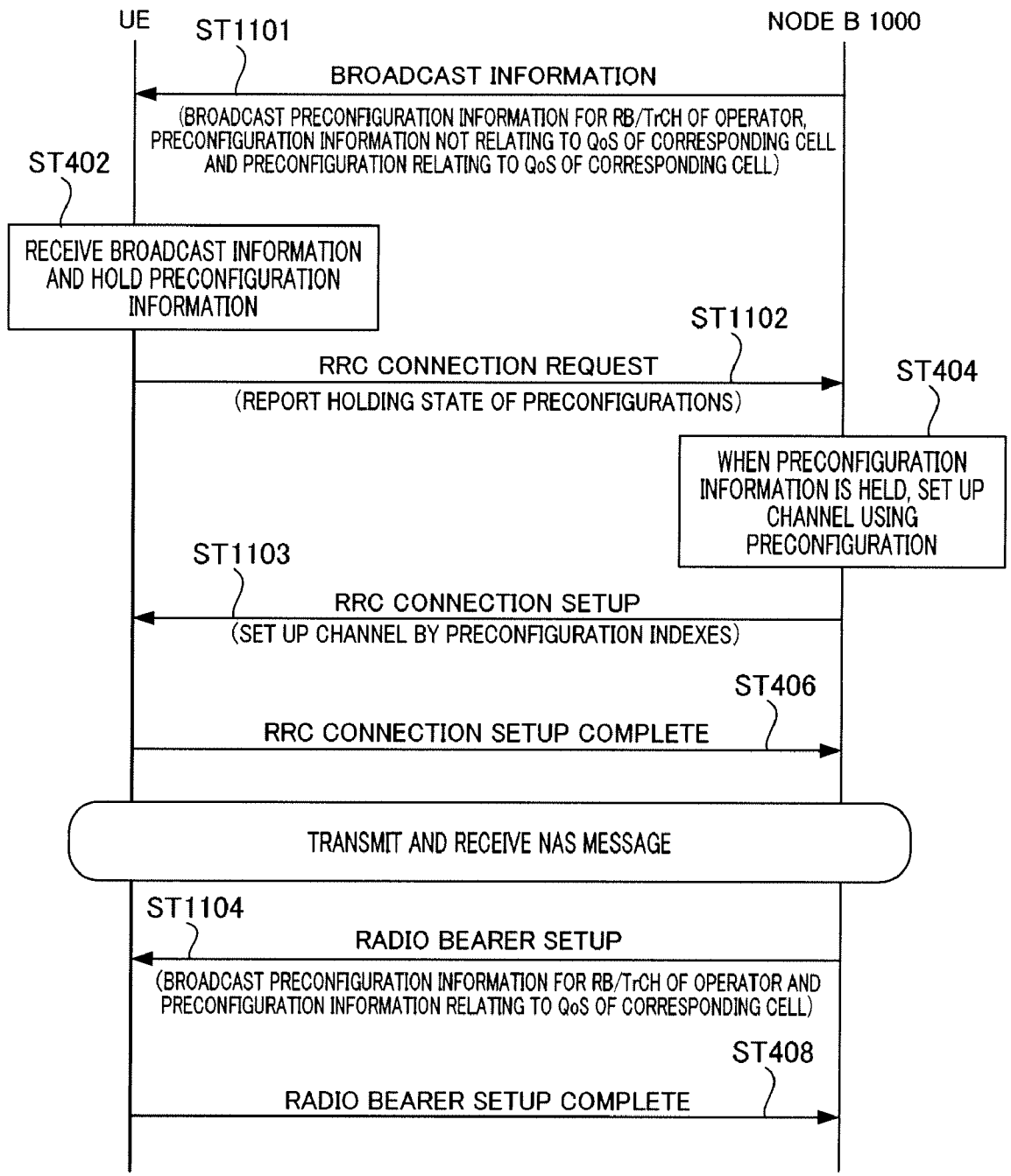
FIG. 30 is a sequence diagram showing an outline of call connection steps according to Embodiment 4 of the present invention.

FIG. 30 is a sequence diagram showing an outline of the call connection steps according to Embodiment 4 of the present invention. However, in FIG. 30, the same components as in FIG. 12 will be assigned the same reference numerals and detailed explanations will be omitted.

In ST1101 in FIG. 30, node B 1000 broadcasts a plurality of sets of preconfiguration information shown in FIG. 29 to the UE.

In ST1102, the UE reports to node B 1000, the fact that the UE stores the PLMN level information, the cell level information relating to QoS and the cell level information not relating to QoS which is the status of the UE, using the RRC connection request message. Here, information reported by the UE may include a flag showing receiving PLMN level information and a flag showing receiving cell level information. Further, it is efficient to show, using the same flag, whether or not the cell level information relating to QoS is stored and whether or not the cell level information not relating to QoS is stored. However, the present invention is not limited this method and may provide other flags.

In ST1103, node B 1000 includes the PLMN level index showing the channel setting information set up in ST404, the cell level index relating to QoS and the cell level index not relating to QoS in the RRC connection setup message and transmits the message to the UE.

In ST1104, node B 1000 includes the PLMN level index showing the channel setting information and the cell level index relating to QoS in the radio bearer setup message and transmits the message to the UE. Here, the second channel setting is performed in this step, and so does not include the cell level index not relating to QoS.

Thus, according to Embodiment 4, by classifying cell levels based on QoS having different influence on layers, once the preconfiguration information not relating to QoS is set up, the information needs not set up again when a channel is added, so that it is possible to reduce the amount of data that is transmitted as the preconfiguration.

Figure 31:
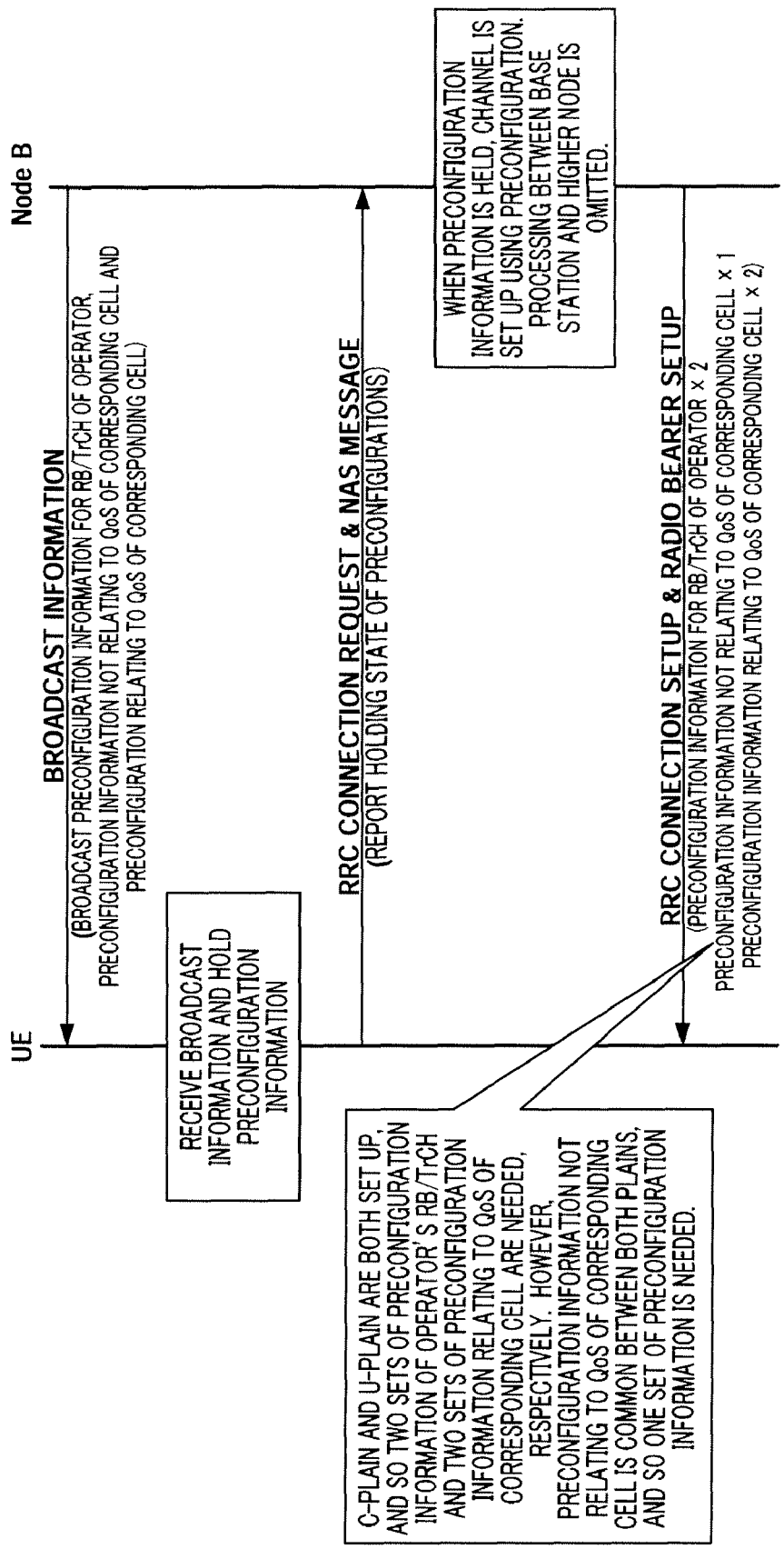
FIG. 31 is a sequence diagram showing call connection steps when a plurality of messages are connected in the call connection steps shown in FIG. 30.

Further, it is equally possible to adopt the call connection steps where a plurality of messages are connected in the call connection steps shown in FIG. 30. FIG. 31 illustrates a sequence diagram of this case. Here, the C-plain and the U-plain are set up at the same time, and, consequently, a single message serves as the RRC connection setup message and the radio bearer setup message. In this case, to perform both settings, two sets of preconfiguration information of operator's RB/TRCH and two sets of preconfiguration information relating to QoS of the cell, are needed. However, preconfiguration information not relating to QoS of the cell is common between the C-plain and the U-plain, and therefore one set of this preconfiguration information is needed.

Further, when one preconfiguration setting represents the settings of the C-plain and the U-plain, only one preconfiguration information of the operator's RB/TRCH and one preconfiguration information relating to QoS of the cell are required.

Embodiment 5

Figure 32:
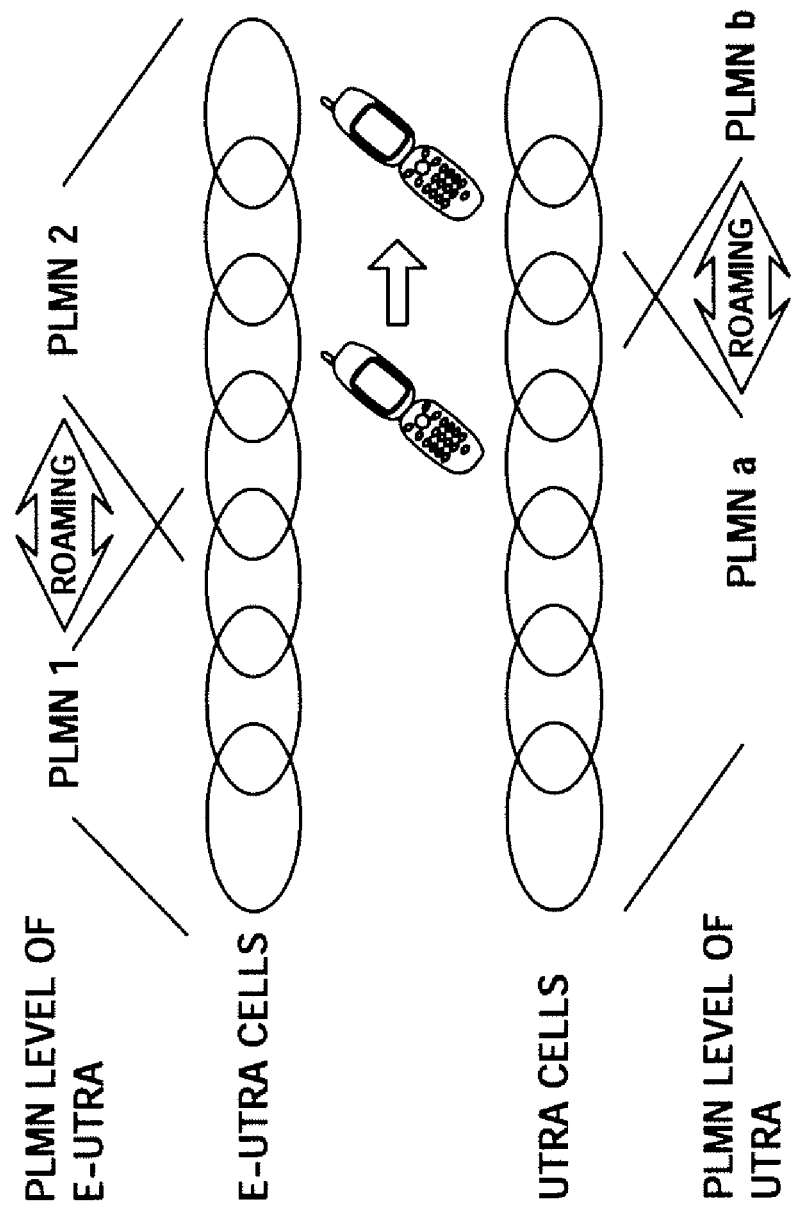
FIG. 32 is a conceptual diagram showing a case where a UE supporting a plurality of RATs moves using the multiple RATs.

As shown in FIG. 32, a case will be explained with Embodiment 5 of the present invention where a UE supporting a plurality of RATs uses a plurality of RATs. However, RATs include the UMTS, GSM (including GPRS and EDGE), LTE/SAE system, 3GPP2 system and systems formed beyond the WLAN (such as 802.11a, b and g).

In FIG. 32, PLMN1 and PLMN2 are supported by respective operators as the E-UTRA, and PLMNa and PLMNb are supported by respective operators as the UTRA. Further, for example, the same operator may support PLMN1 and PLMNa or different operators may support these.

Here, assume that a UE connects with PLMN2 in the E-UTRA and performs communication. In PLMN2, E-UTRA preconfiguration information excluding cell level information and updated information does not change. Therefore, the UE needs not receive those information two or more times.

However, when the UE moves in this PLMN2, the PLMN in the UTRA may change. That is, in FIG. 32, PLMNa and PLMNb can be switched. In this case, unless the UE receives preconfiguration information of PLMNb, the UE would not be able to use the preconfiguration upon moving from the E-UTRA to the UTRA.

Therefore, a system is needed that allows the UE connected to the E-UTRA and move in PLMN2 to acquire preconfiguration information again when the connection candidate in the UTRA changes. Further, a system is needed that allows the node B to know whether or not the UE has preconfiguration information of PLMNb. Further, a system is possible where the current RAT broadcasts preconfiguration information of other RATs. Here, assume that the current RAT broadcasts preconfiguration information of other RATs. Further, sending preconfiguration information with an identifier identifying to which operator other RATs belong, is possible. This step is performed to clearly show the terminal to which operator other RATs belong. However, if the detail needs not be shown to the terminal clearly, it is equally possible to set up only information that is needed to set up a channel as preconfiguration information.

In particular, when operator A provides the E-UTRA service only in a limited area and operator B provides the UTRA service in the wide areas other than the limited area, the UE needs to move between operator A and operator B, and, as a result, the state shown in FIG. 32 is often caused.

Figure 33:
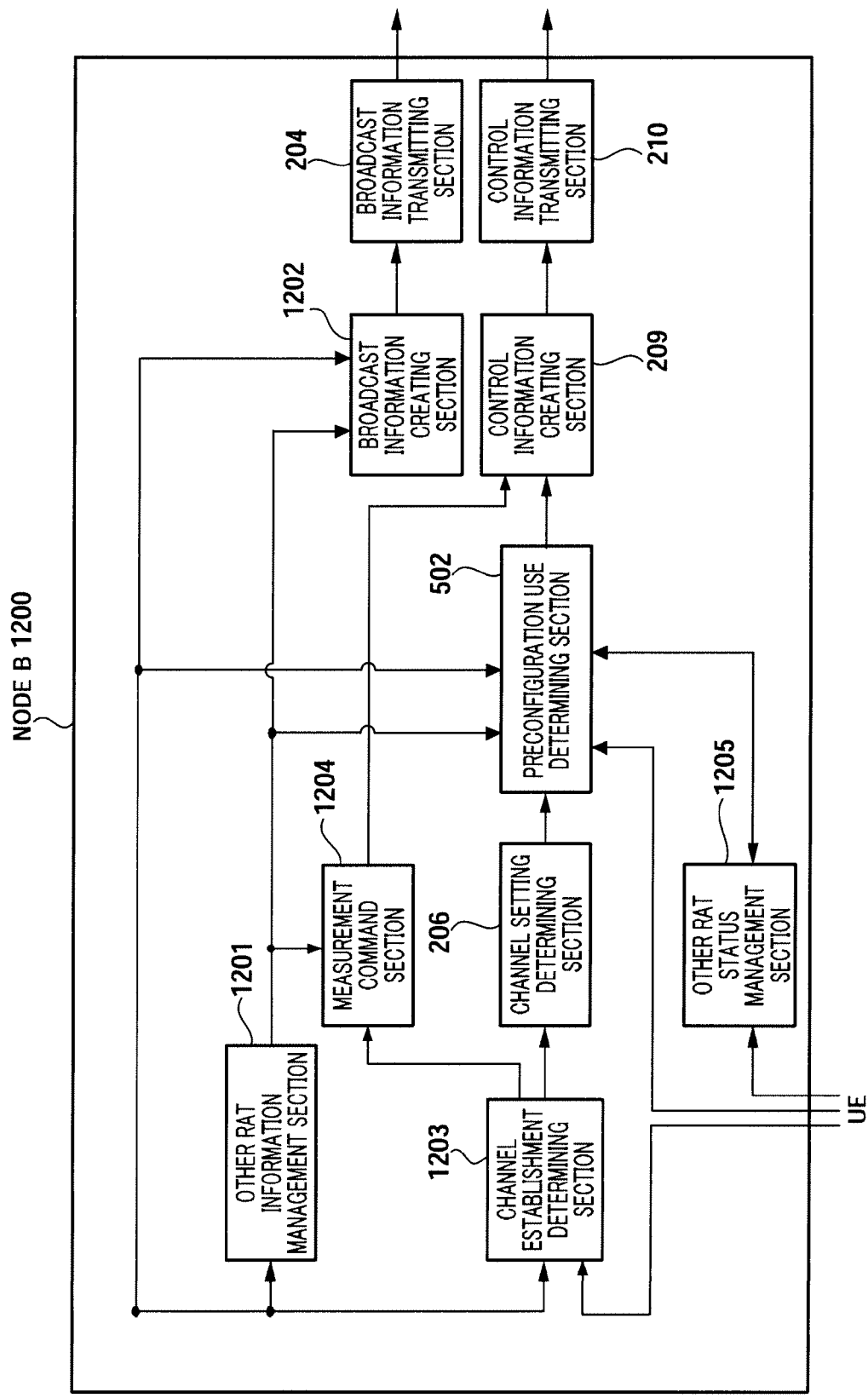
FIG. 33 is a block diagram showing a configuration of the node B according to Embodiment 5 of the present invention.

FIG. 33 is a block diagram showing the configuration of node B 1200 according to Embodiment 5 of the present invention. FIG. 33 differs from FIG. 20 in adding measurement command section 1204, replacing cell level information management section 202 by other RAT information management section 1201, broadcast information creating section 203 by broadcast information creating section 1202, channel establishment determining section 205 by channel establishment determining section 1203, and neighboring cell status management section 501 by other RAT status management section 1205, and removing PLMN level information management section 201 and UE status management section 207.

In FIG. 33, other RAT information management section 1201 manages other RAT information transmitted from a higher layer (or a higher node) (not shown). Other RAT information includes preconfiguration information used in other RATs, PLMN information of the other RATs and information showing whether or not the information managed in the node B is the same as the information managed in neighboring cells. Other RAT information management section 1201 outputs the preconfiguration information used in other RATs to broadcast information creating section 1202 and preconfiguration use determining section 502. Further, other RAT information management section 1201 outputs to measurement command section 1204, information showing whether or not the information managed in node B 1200 is the same as the information managed in the node B in neighboring cells.

Broadcast information creating section 1202 creates information including the preconfiguration information outputted from other RAT information management section 1201 and used in the other RATs, and outputs the created broadcast information to broadcast information transmitting section 204.

Channel establishment determining section 1203 receives a report from a higher layer (not shown) or the UE, and performs a channel setting and management of radio resources for the UE. To be more specific, channel establishment determining section 1203 determines, for example, the measurement command, handover and call connection to the UE. The measurement command and handover (shift control) will be explained below in detail. When channel establishment determining section 1203 determines the measurement command, channel establishment determining section 1203 reports this determination result to measurement command section 1204, and, when channel establishment determining section 1203 determines shift control, reports this determination result to channel setting section 206.

Measurement command section 1204 determines details that are included in a measurement control message and outputs the determined details to control information creating section 209. Further, when measurement command section 1204 decides that the information managed in node B 1200 is different from the information managed in neighboring cells based on the information showing whether or not the information outputted from other RAT information management section 1201 and managed in node B 1200 is the same as the information managed in cells neighboring node B 1200, measurement command section 1204 reports the determination result to control information creating section 209 and includes the result in control information.

Channel setting determining section 206 determines command details of shift control to the UE in response to the determination of shift control reported from channel establishment determining section 1203. To be more specific, channel setting determining section 206 determines the details of a handover command message. The determined command details are reported to preconfiguration use determining section 502.

Other RAT status management section 1205 manages a preconfiguration acquisition status included in the measurement report message reported from the UE (i.e., information showing whether or not the UE acquired the preconfiguration information), and reports this acquisition status to preconfiguration use determining section 502.

Preconfiguration use determining section 502 checks whether or not the UE that is a shift control target can use the preconfiguration with reference to other RAT status management section 1205, based on the details of the handover command message reported from channel setting determining section 206. If the UE can use the preconfiguration, preconfiguration use determining section 502 determines to perform a handover using the preconfiguration information outputted from other RAT information management section 1201 and used in other RATs. On the other hand, if the UE cannot use the preconfiguration, preconfiguration use determining section 502 determines to perform a handover without using the preconfiguration information. This determination details are reported to control information creating section 209.

Figure 34:
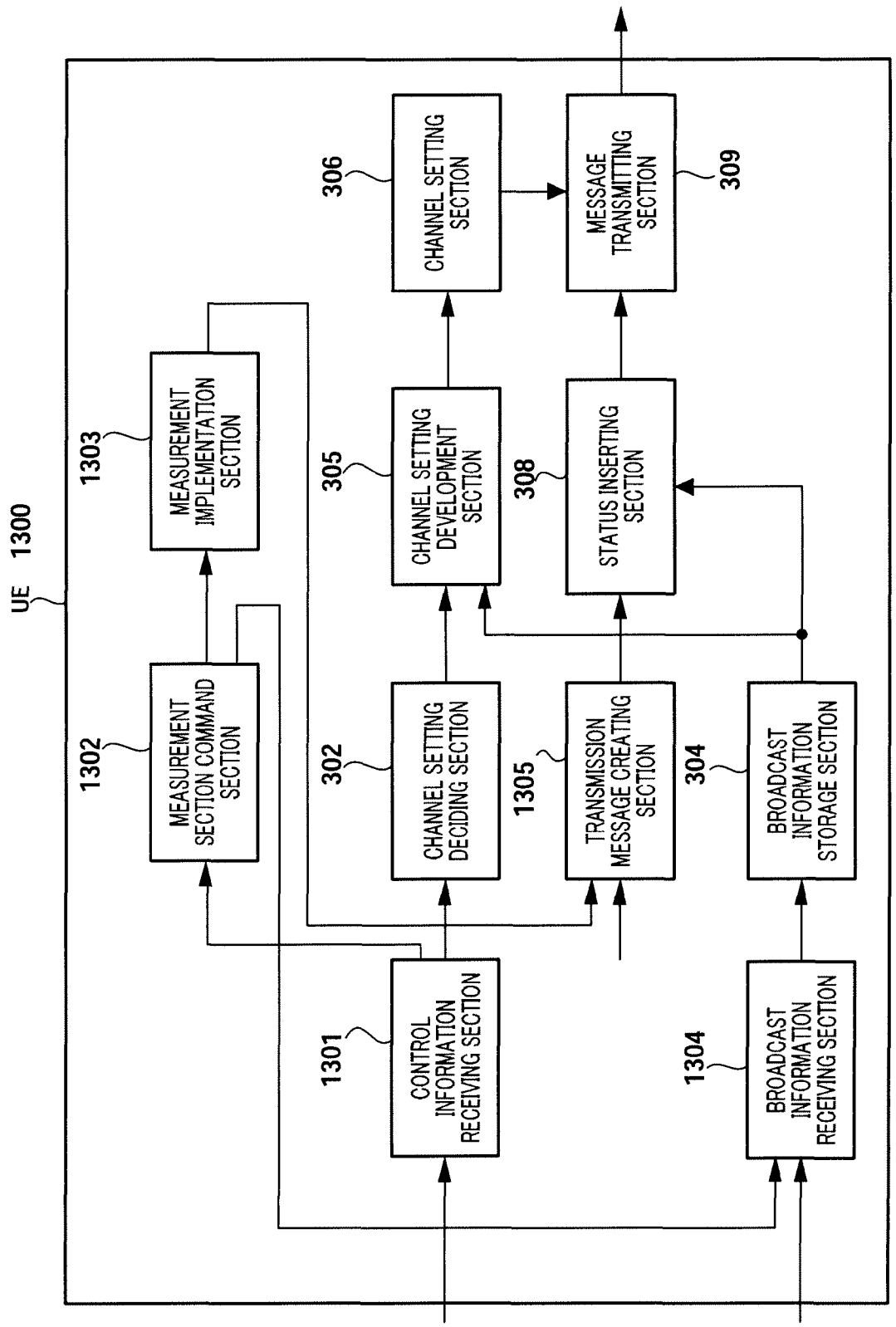
FIG. 34 is a block diagram showing a configuration of a UE according to Embodiment 5 of the present invention.

FIG. 34 is a block diagram showing the configuration of UE 1300 according to Embodiment 5 of the present invention. FIG. 34 differs from FIG. 11 in adding measurement command section 1302 and measurement implementation section 1303, and replacing control information receiving section 301 by control information receiving section 1301, broadcast information creating section 303 by broadcast information creating section 1304, and transmission message creating section 307 by transmission message creating section 1305.

In FIG. 34, control information receiving section 1301 receives the control information transmitted from node B 1200 shown in FIG. 33 and performs predetermined receiving processing on the received control information. Among the control information after the receiving processing, the measurement control message is outputted to measurement command section 1302 and the handover command message to perform shift control is outputted to channel setting deciding section 302.

According to the measurement control message outputted from control information receiving section 1301, measurement command section 1302 commands measurement implementation section 1303 to measure channel quality of other RATs. Further, when the measurement control message reports that the information managed in node B 1200 and the information managed in neighboring cells are different, measurement command section 1302 commands broadcast information receiving section 1304 to acquire broadcast information.

Measurement implementation section 1303 measures the channel quality of other RATs according to the command from measurement command section 1302 and outputs the measurement result to transmission message creating section 1305.

In response to the command from measurement command section 1302, broadcast information receiving section 1304 receives the broadcast information that includes the preconfiguration and that is transmitted from node B 1200 shown in FIG. 33, performs predetermined receiving processing on the received broadcast information and outputs the broadcast information after the receiving processing, to broadcast information storage section 304.

Transmission message creating section 1305 creates a measurement report message based on the measurement result outputted from measurement implementation section 1303 and outputs the created measurement report message to status inserting section 308. Further, transmission message creating section 1305 also creates a message reporting the result of handover processing, and outputs the created message to status inserting section 308. Further, in status inserting section 308, the receiving status of the other RAT preconfiguration is inserted into the measurement report message.

Next, the outline of handover processing steps between node B 1200 shown in FIG. 33 and UE 1300 shown in FIG. 34 will be explained using FIG. 35. Here, processing steps will be explained in detail after a handover showing that the connection candidate in the UTRA changes is performed when UE 1300 moves in PLMN2.

Figure 35:
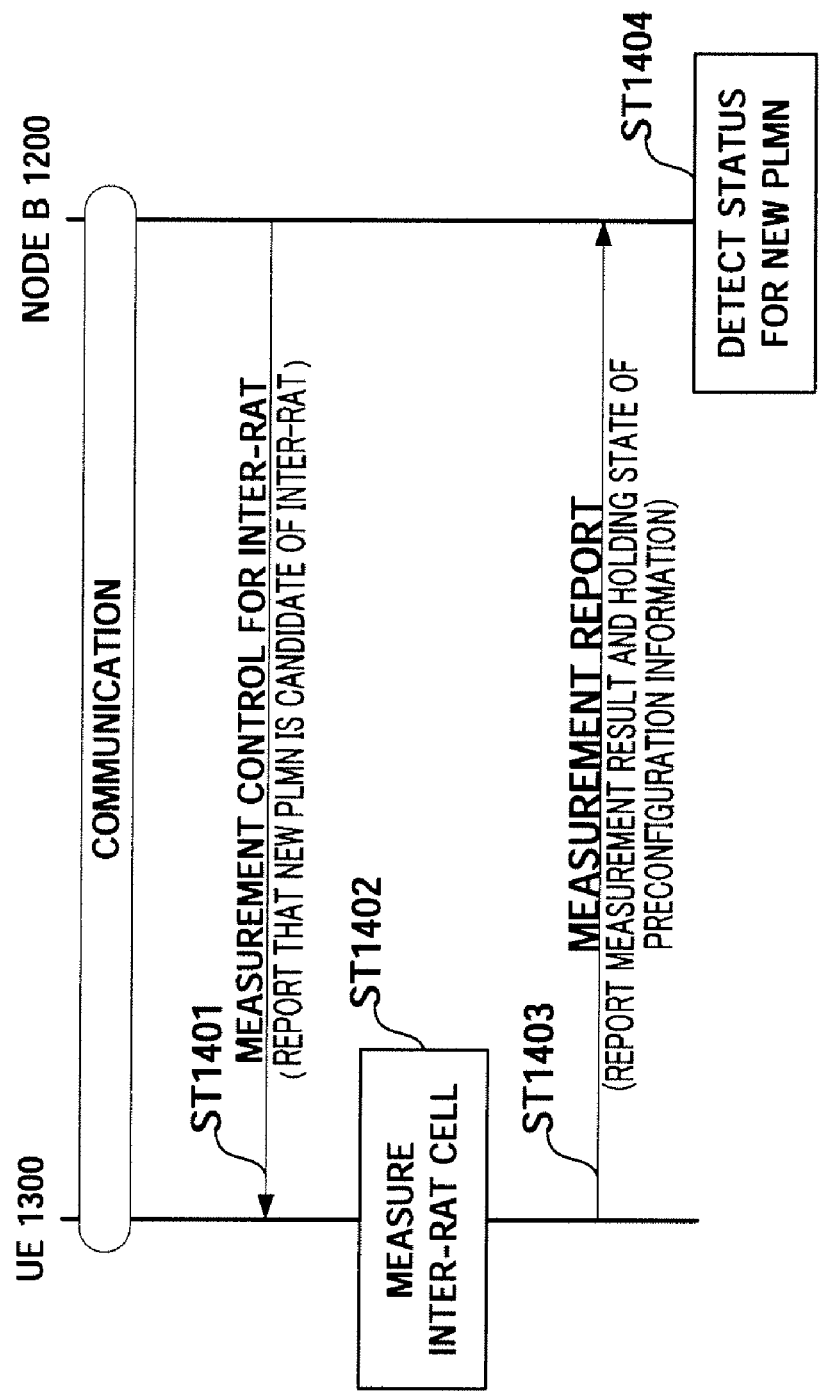
FIG. 35 is a sequence diagram showing an outline of handover processing steps for the node B shown in FIG. 33 and the UE shown in FIG. 34.

In FIG. 35, in ST1401, node B 1200 transmits the measurement control message to UE 1300 and commands UE 1300 to perform a inter-RAT quality measurement in preparation for a handover to another RAT (i.e. an inter-RAT handover). Information included in a measurement control message is, for example, information standardized in 3GPP. Further, the measurement control message also shows that a new PLMN is a candidate of the inter-RAT. By this means, UE 1300 reads out preconfiguration information of a new PLMN in addition to the inter-RAT quality measurement by the measurement control message. Further, although broadcast information is assumed to be transmitted from node B 1200, broadcast information of an inter-RAT cell may be received upon the inter-RAT quality measurement.

In ST1402, the UE measures the inter-RAT channel quality and, in ST1403, UE 1300 transmits the measurement result to node B 1200 according to the command from the measurement control message. At the same time, a preconfiguration acquisition status is reported in addition to the measurement result standardized in 3GPP. By this means, in ST1404, node B 1200 can check whether or not UE 1300 acquires preconfiguration information with respect to a new PLMN.

Thus, according to Embodiment 5, in a case where a UE supporting a plurality of RATs moves in a PLMN and the connection candidate in another RAT change, the UE measures quality of the another RAT and reports the quality measurement result and the acquisition status of preconfiguration information of the another RAT that is a destination of the UE, to the node B, so that the node B can check whether or not the UE acquires the preconfiguration information of the another RAT.

Further, according to the present embodiment, assume that preconfiguration information of other RATs is transmitted from the RAT to which the UE currently belongs. However, the preconfiguration information of other RAT's may be transmitted only from the other RATs. In this case, the UE receives broadcast information reported from the other RATs.

Embodiment 6

The node B according to Embodiment 6 of the present invention has the same configuration as and partly different functions from the configuration shown in FIG. 33 of Embodiment 5, and will be explained using FIG. 33.

Other RAT information management section 1201 manages information of a destination cell and outputs the destination cell information to preconfiguration use determining section 502.

Preconfiguration use determining section 502 includes the destination cell information outputted from other RAT information management section 1201 in a handover command message and outputs the message to control information creating section 209.

Figure 36:
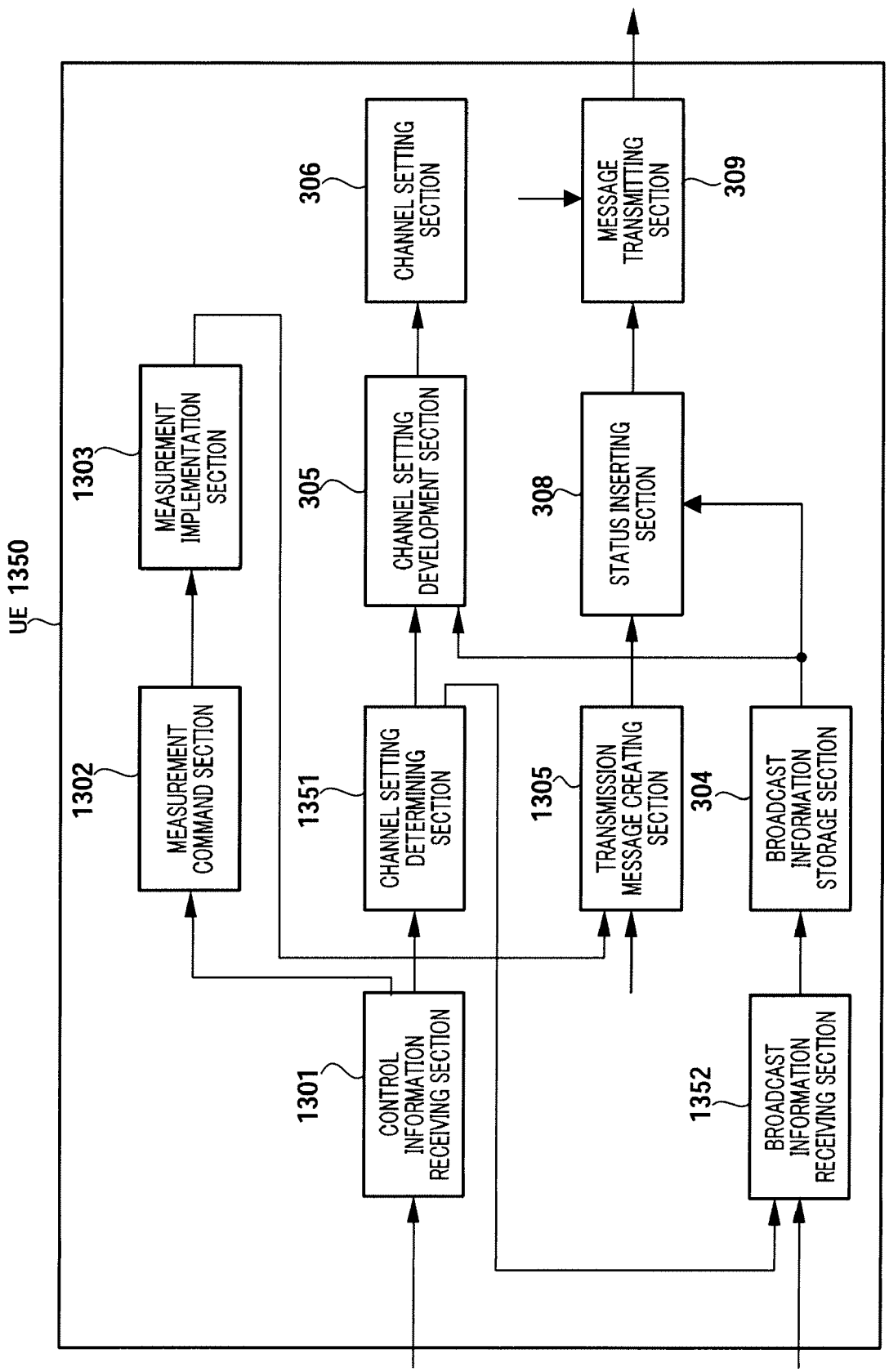
FIG. 36 is a block diagram showing a configuration of the UE according to Embodiment 6 of the present invention.

FIG. 36 is a block diagram showing the configuration of UE 1350 according to Embodiment 6 of the present invention. FIG. 36 differs from FIG. 34 in replacing channel setting determining section 302 by channel setting determining section 1351 and broadcast information receiving section 1304 by broadcast information receiving section 1352.

In FIG. 36, channel setting section 1351 commands broadcast information receiving section 1352 to acquire broadcast information. That is, channel setting section 1351 reports in a handover command message that the cell of the handover destination broadcasts different PLMN information. If the UE can soon read out broadcast information of the handover destination, channel setting command section 1351 may soon command broadcast information receiving section 1352 to acquire the broadcast information. Further, channel setting command section 1351 may command broadcast information receiving section 1352 to acquire broadcast information at the timing when handover information response showing completion of handover is sent to the node B that is the handover destination or when channel setting command section 1351 receives ACK in response to that handover information response.

Next, the outline of handover processing steps between node B 1200 shown in FIG. 33 and UE 1350 shown in FIG. 36 will be explained using FIG. 37. Here, handover processing steps will be explained in detail in a case where UE 1350 moves in PLMN2 and the connection candidate in the UTRA changes.

Figure 37:
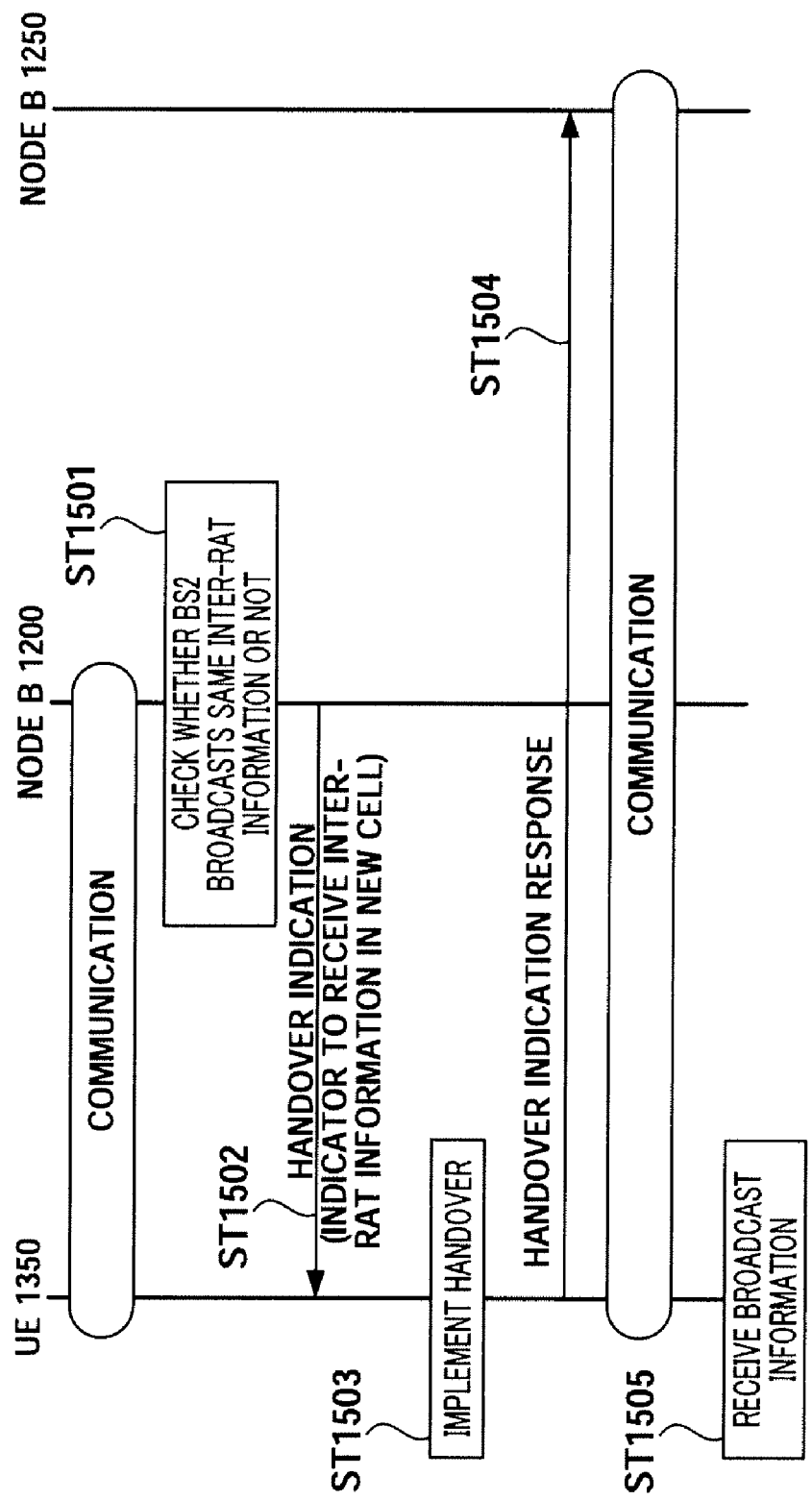
FIG. 37 is a sequence diagram showing an outline of handover processing steps for the node B shown in FIG. 33 and the UE shown in FIG. 36.

In FIG. 37, in ST1501, node B 1200 checks whether or not inter-RAT preconfiguration information reported from node B 1250 that is destination of UE 1350, corresponds to the preconfiguration information acquired in the UE. Here, assume that these sets of information are not the same.

In ST1502, node B 1200 includes preconfiguration information in a handover indication message and transmits the result to UE 1350. In ST1503, UE 1350 performs a handover.

In ST1504, UE 1350 transmits a handover indication response message to node B 1250 that is a destination of UE 1350, so that communication can be performed between UE 1350 and node B 1250. In ST1505, UE 1350 receives broadcast information transmitted from node B 1250.

Thus, according to Embodiment 6, in a case where the UE supporting a plurality of RATs moves in a PLMN and candidates of another RAT change, the node B reports in a handover command to the UE that the preconfiguration information of the another RAT of a destination of the UE is different, so that the UE can receive broadcast information from the destination RAT immediately after the handover.

Embodiment 7

A case will be explained with Embodiment 7 where a layered preconfiguration described in Embodiment 1 is adopted in a plurality of RATs.

Different RATs use different radio access schemes and therefore employ different channel settings. To be more specific, various schemes such as 802.11a and 802.11b are adopted in the WLAN network, an OFDM base scheme is adopted in the LTE/SAE network and the W-CDMA scheme is adopted in the UMTS network.

Figure 38:
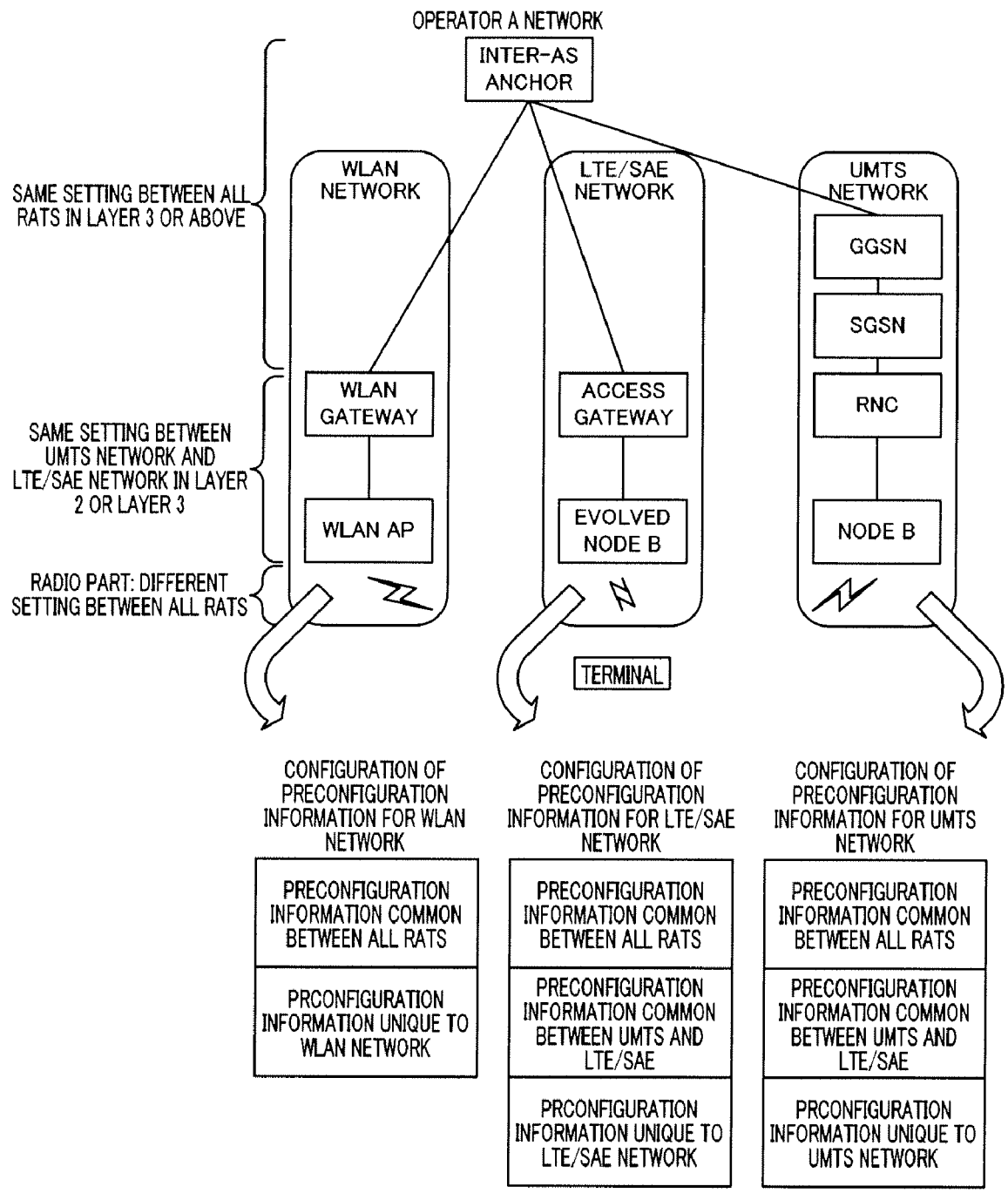
FIG. 38 illustrates architecture in which a WLAN network, LTE/SAE network and UMTS network are provided by one operator.

Thus, although the schemes in radio parts are different, focusing on the higher layers, some of the settings are common. FIG. 38 illustrates architecture in which a WLAN network, LTE/SAE network and UMTS network are provided by one operator. As shown in the figure, although the setting of the radio part varies between all RAT's, a system design is possible where the settings of layer 2 and layer 3 are the same between the LTE/SAE network and the UMTS network. Further, a system design is suggested where settings are the same between all RATs in layer 3 or above. In this case, the preconfiguration used in each network is as follows.

That is, in the WLAN network, the preconfiguration can be divided into the preconfiguration information common between all RATs and the preconfiguration information unique to the WLAN network. Further, in the LTE/SAE network, the preconfiguration can be divided into the preconfiguration information common between all RATs, the preconfiguration information unique to the UMTS network and the preconfiguration information unique to the LTE/SAE network. Further, the preconfiguration information in the UMTS network can be classified into the preconfiguration information common between all RATs, the preconfiguration information common between the UMTS network and the LTE/SAE network, and the preconfiguration unique to the UMTS network. As described above, it is possible to realize preconfigurations in a layered manner between a plurality of RATs.

Figure 39:
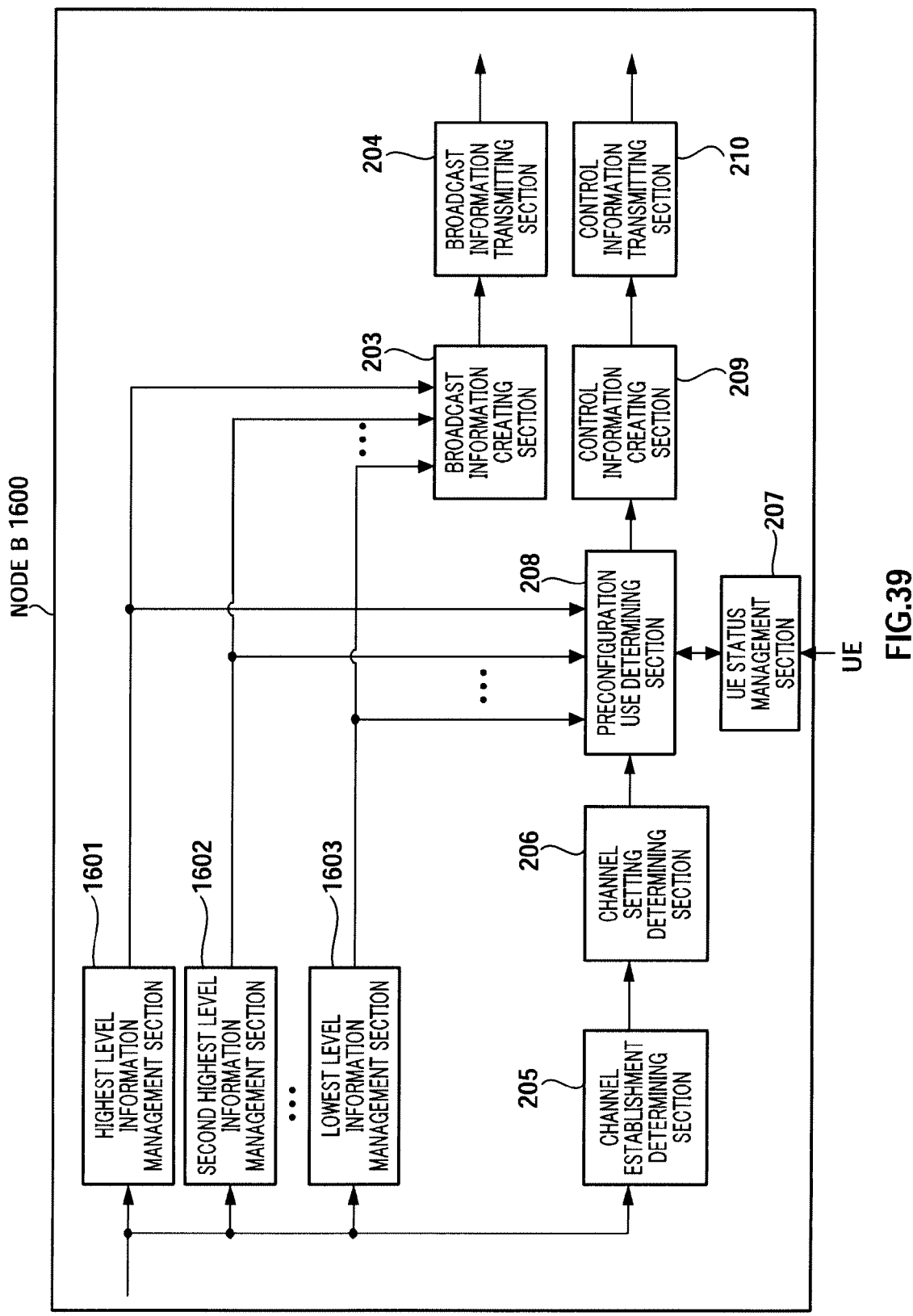
FIG. 39 is a block diagram showing a configuration of the node B according to Embodiment 7 of the present invention.

FIG. 39 is a block diagram showing the configuration of node B 1600 according to Embodiment 7 of the present invention. FIG. 39 differs from FIG. 6 in deleting PLMN level information management section 201 and cell level information management section 202, and adding highest level information management section 1601, second highest level information management section 1602 and lowest information management section 1603.

In FIG. 39, highest level information management section 1601 manages the preconfiguration information of the highest layer level that is transmitted from a higher layer (or a higher node) (not shown). That is, in the example shown in FIG. 38, the preconfiguration information common between all RATs is managed. The preconfiguration information common between all RATs is outputted to broadcast information creating section 203 and preconfiguration use determining section 208.

Second level information management section 1602 manages the preconfiguration information of the second highest layer level that is transmitted from a higher layer (or a higher node) (not shown). That is, in the example shown in FIG. 38, the preconfiguration information common between the LTE/SAE network and the UMTS network is managed. The preconfiguration information common between the LTE/SAE network and the UMTS network is outputted to broadcast information creating section 203 and preconfiguration use determining section 208.

Lowest level information management section 1603 manages the preconfiguration information of the lowest layer level that is transmitted from a higher layer (or a higher node) (not shown). That is, in the example shown in FIG. 38, RAT-specific preconfiguration information is managed. The RAT-specific preconfiguration information is outputted to broadcast information creating section 203 and preconfiguration use determining section 208.

As described above, node B 1600 has an information management section per layer, so that level information is reported in respective transmission units (e.g., blocks).

Next, a case will be explained with FIG. 40 where a UE performs a handover from the LTE/SAE network to the UMT network. Here, as shown in FIG. 38, assume that the difference of preconfigurations between two RATs is only the radio part.

Figure 40:
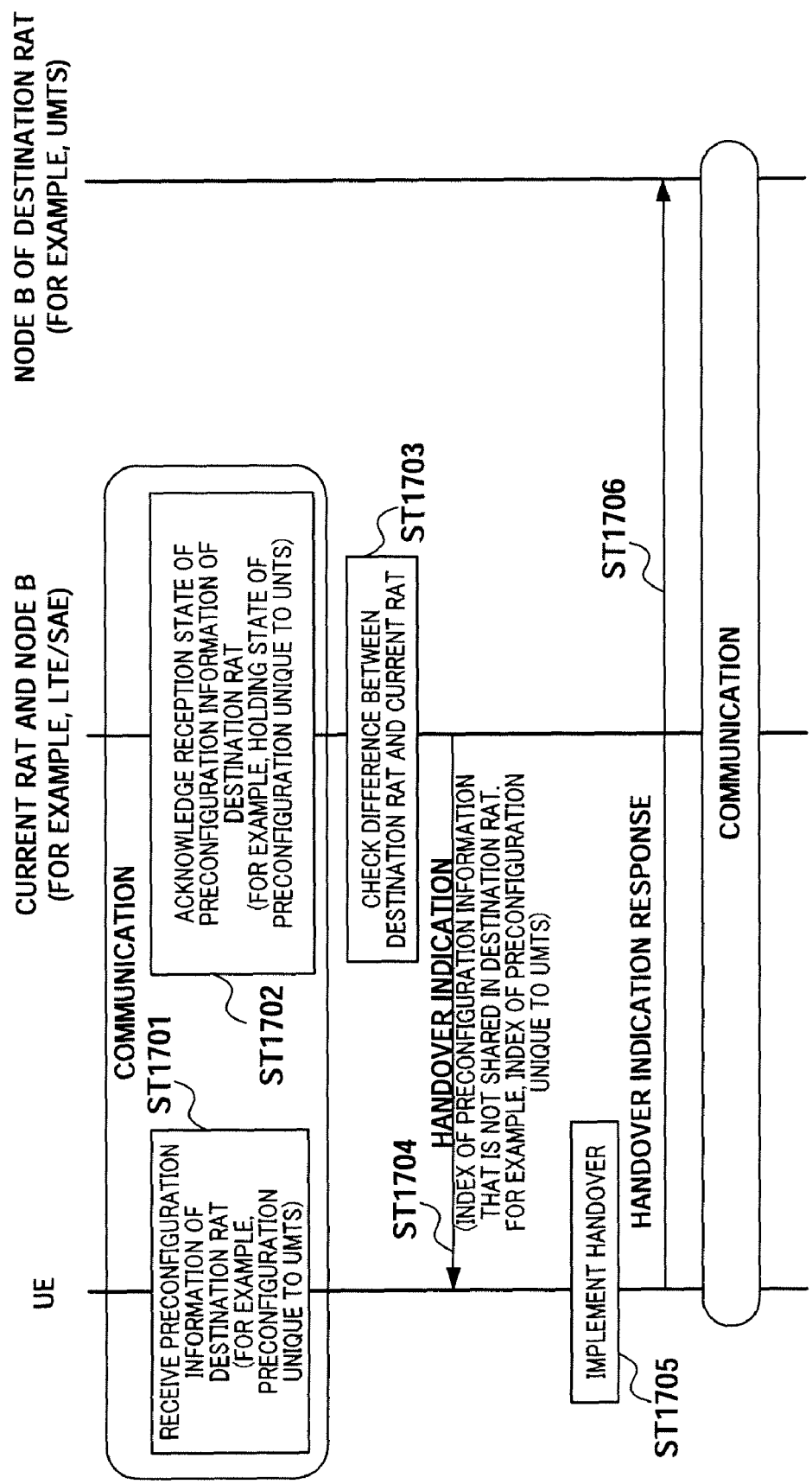
FIG. 40 is a sequence diagram showing a case where a UE performs a handover of a network from an LTE/SAE network to an IMTS network.

In FIG. 40, in ST1701, the UE receives preconfiguration information of a destination RAT (here, preconfiguration information unique to the UMTS network) from the node B communicating with the UE in the LTE/SAE network. In ST1702, the node B in the LTE/SAE network recognizes the acquisition state of the preconfiguration information of the destination RAT from the UE. By this means, the UE can fully use the preconfigurations.

In ST1703, the node B in the LTE/SAE network checks the difference between the layer level information of the RAT communicating with the UE and the layer level information of the destination RAT. In the example shown in FIG. 38, the highest and second highest level information are common between the LTE/SAE network and the UMTS network, in ST1704, the node B in the LTE/SAE network includes the index of the preconfiguration information unique to the UMTS in a handover indication message and transmits the message to the UE.

In ST1705, the UE performs a handover. In ST1706, the UE performs communication with the node B in the UMTS network that is a destination RAT by transmitting a handover indication response message to this node B.

Further, although the present embodiment does not describe details, as shown in the other embodiments, it is possible to transmit information showing whether or not preconfiguration information has been received, using a message for requesting connection establishment such as an RRC connection request message, a message for reporting a measurement result such as a measurement report message, or another message for requesting call establishment. Further, as for a method of report, a report method of providing individual flags to transmit the information of each RAT, is generally used.

As described above, according to Embodiment 7, it is possible to reduce the amount of data transmitted as preconfigurations by adopting preconfigurations common settings between layers of a plurality of RATs, realizing preconfigurations in a layered manner between a plurality of RATs, and adopting the preconfigurations upon a handover between RATs.

Further, although a case has been described with the present embodiment where the settings in layer 3 or above are common between all RATs and the settings of layer 2 and layer 3 are common between the LTE/SAE network and the UMTS network such that the settings in these layers match completely between a plurality of RATs, even when part of these settings is not common, it is still possible to implement the present invention if the UE can change the setting according to the preconfiguration information acquired by the UE.

Although a case has been described with the above-described embodiments where the preconfiguration information is divided into the PLMN level and the cell level, the present invention is not limited thereto, and the preconfiguration information may also be divided into three or above levels including the PLMN level, the RAN level (a set of a plurality of cells) and the cell level, or divided into two different levels including the PLMN level and the RAN level.

Although a case has been described with the above-described embodiments where the node B creates broadcast information and control information, the present invention is not limited thereto, and some or all of the functions of the node B may be assigned to apparatuses higher than the node B, for example, the core network node such as the radio network controller ("RNC"), SGSN and GGSN.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-084043, filed on Mar. 24, 2006, including the specification, drawings and abstract, is incorporated herein by reference in its entirety.

Industrial Applicability

The wireless communication base station apparatus according to the present invention can reduce the size of messages in call connection and is applicable to the WCDMA wireless communication system and so on.

The invention claimed is:

1. A wireless communication base station apparatus comprising:
  a management section that manages in a layered manner preconfiguration information comprising combinations of channel setting information and indexes representing the combinations;
  a broadcast section that broadcasts public land mobile network level preconfiguration information comprising combinations of radio bearers and transport channels employing common settings by an operator, each combination of the public land mobile network level preconfiguration information being associated with a corresponding one of the indexes, and cell level preconfiguration information comprising combinations of physical channels employing different settings between cells, each combination of the cell level preconfiguration information being associated with a corresponding one of the indexes;
  a control information creating section that includes information, showing that preconfiguration information of another radio access technology has changed, in control information which is created by the control information creating section and which specifies the channel setting information by indicating a first index among the indexes representing the public land mobile network level preconfiguration information and a second index among the indexes representing the cell level preconfiguration information; and
  a transmitting section that transmits the created control information.

2. The wireless communication base station apparatus according to claim 1, wherein the control information creating section commands a wireless communication terminal apparatus communicating with the wireless communication base station apparatus to perform a handover to the other radio access technology.

3. The wireless communication base station apparatus according to claim 1, wherein the control information creating section commands a wireless communication terminal apparatus communicating with the wireless communication base station apparatus to measure channel quality of the other radio access technology.

4. The wireless communication base station apparatus according to claim 1, further comprising a management section which manages a common setting between a plurality of radio access technologies by a common preconfiguration between the plurality of radio access technologies.

* * * * *